US009189359B2

(12) United States Patent
Yamauchi et al.

(10) Patent No.: US 9,189,359 B2
(45) Date of Patent: Nov. 17, 2015

(54) COMPUTER PRODUCT, CONTROL APPARATUS, AND CONTROL METHOD

(71) Applicant: FUJITSU LIMITED, Kawasaki-shi, Kanagawa (JP)

(72) Inventors: Hiromasa Yamauchi, Kawasaki (JP); Koichiro Yamashita, Hachioji (JP); Takahisa Suzuki, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 354 days.

(21) Appl. No.: 13/759,435

(22) Filed: Feb. 5, 2013

(65) Prior Publication Data
US 2013/0151882 A1 Jun. 13, 2013

Related U.S. Application Data

(63) Continuation of application No. PCT/JP2010/063332, filed on Aug. 5, 2010.

(51) Int. Cl.
G06F 1/26 (2006.01)
G06F 1/32 (2006.01)
G06F 11/30 (2006.01)
G06F 9/44 (2006.01)
G06F 9/48 (2006.01)
(Continued)

(52) U.S. Cl.
CPC .............. *G06F 11/3058* (2013.01); *G06F 1/26* (2013.01); *G06F 9/44* (2013.01); *G06F 9/4856* (2013.01); *G06F 9/4893* (2013.01); *G06F 1/3203* (2013.01); *G06F 1/329* (2013.01); *G06F 9/461* (2013.01); *G06F 9/5094* (2013.01); *Y02B 60/144* (2013.01)

(58) Field of Classification Search
CPC ....... G06F 1/3203; G06F 1/329; G06F 9/461; G06F 9/4856; G06F 9/5088; G06F 9/5094
USPC .................................. 713/300, 320, 330, 340
See application file for complete search history.

(56) References Cited

U.S. PATENT DOCUMENTS 6,006,248 A 12/1999 Nagae
2003/0115239 A1 6/2003 Togawa
(Continued)

FOREIGN PATENT DOCUMENTS

JP 60-077258 A 5/1985
JP 10-078937 A 3/1998
(Continued)

*Primary Examiner* — Michael J Brown
(74) *Attorney, Agent, or Firm* — Arent Fox LLP

(57) ABSTRACT

A computer-readable recording medium stores a control program causing a processor of a first terminal to execute a process that includes detecting that a remaining battery level of the first terminal has become less than or equal to a first threshold while a task is under execution by the first terminal; suspending execution of the task upon detecting that the remaining battery level of the first terminal has become less than or equal to the first threshold; transmitting identification information of the task to a second terminal upon detecting that the remaining battery level of the first terminal has become less than or equal to the first threshold; receiving from the second terminal and after transmitting the identification information of the task, information related to a potential of executing the task; and transmitting to the second terminal, information corresponding to the information related to the potential of executing the task.

14 Claims, 26 Drawing Sheets

(51) Int. Cl.
*G06F 9/50* (2006.01)
*G06F 9/46* (2006.01)

(56) References Cited

U.S. PATENT DOCUMENTS

2006/0199530 A1  9/2006  Kawasaki
2010/0321647 A1* 12/2010 Schuler et al. ............... 353/121

FOREIGN PATENT DOCUMENTS

| | | |
|---|---|---|
| JP | 2002-099432 A | 4/2002 |
| JP | 2005-141669 A | 6/2005 |
| JP | 2006-246202 A | 9/2006 |
| JP | 2006-268166 A | 10/2006 |
| JP | 2010-039802 A | 2/2010 |

* cited by examiner

FIG.4

| AUTHORIZED TERMINAL | MIGRATION-DESTINATION TERMINAL |
|---|---|
| TERMINAL #1 | |

FIG.5

| AUTHORIZED TERMINAL | MIGRATION-DESTINATION TERMINAL |
|---|---|
| TERMINAL #0 | |

FIG.6

| TASK IDENTIFICATION INFORMATION | REAL-TIME CONSTRAINT | FREQUENCY |
|---|---|---|
| TASK #0 | 100 [ms] | 100 [%] |
| TASK #1 | 200 [ms] | 100 [%] |
| TASK #2 | - | 50 [%] |
| TASK #3 | - | 50 [%] |

FIG.7

| FREQUENCY | SUPPLY VOLTAGE |
|---|---|
| 100 [%] | 1.1 [V] |
| 70 [%] | 0.8 [V] |
| 50 [%] | 0.6 [V] |
| 30 [%] | 0.4 [V] |

FIG.8

| TASK IDENTIFI-CATION INFORMATION | DATA SIZE UNDER EXECUTION | CODE SIZE | POWER COST (DATA ACQUIRED DURING EXECUTION) | POWER COST (DATA ACQUIRED DURING EXECUTION+ CODE) | COEFFICIENT | PER PACKET COMMUNI-CATION POWER COST |
|---|---|---|---|---|---|---|
| TASK #0 | ... | ... | ... | ... | ... | ... |
| TASK #1 | ... | ... | ... | ... | ... | ... |
| TASK #2 | 4 [KB] | 1 [KB] | 48 [μW] | 60 [μW] | 2 | 1.5 [μW] |
| TASK #3 | ... | ... | ... | ... | ... | ... |

FIG.11

| TASK IDENTIFICATION INFORMATION | ASSIGNMENT-SOURCE TERMINAL | STATE |
|---|---|---|
| TASK #0 | TERMINAL #0 | UNDER EXECUTION |
| TASK #1 | TERMINAL #0 | QUEUED |
| TASK #2 | TERMINAL #0 | QUEUED |
| TASK #3 | TERMINAL #0 | QUEUED |

FIG.12

| TASK IDENTIFICATION INFORMATION | ASSIGNMENT-SOURCE TERMINAL | STATE |
|---|---|---|
|  |  |  |

FIG.17

| TASK IDENTIFICATION INFORMATION | ASSIGNMENT-SOURCE TERMINAL | STATE |
|---|---|---|
| TASK #0 | TERMINAL #0 | UNDER EXECUTION |
| TASK #1 | TERMINAL #0 | QUEUED |
| TASK #2 | TERMINAL #0 | MIGRATED |
| TASK #3 | TERMINAL #0 | MIGRATED |

FIG.18

| TASK IDENTIFICATION INFORMATION | ASSIGNMENT-SOURCE TERMINAL | STATE |
|---|---|---|
| TASK #2 | TERMINAL #0 | QUEUED |
| TASK #3 | TERMINAL #0 | QUEUED |

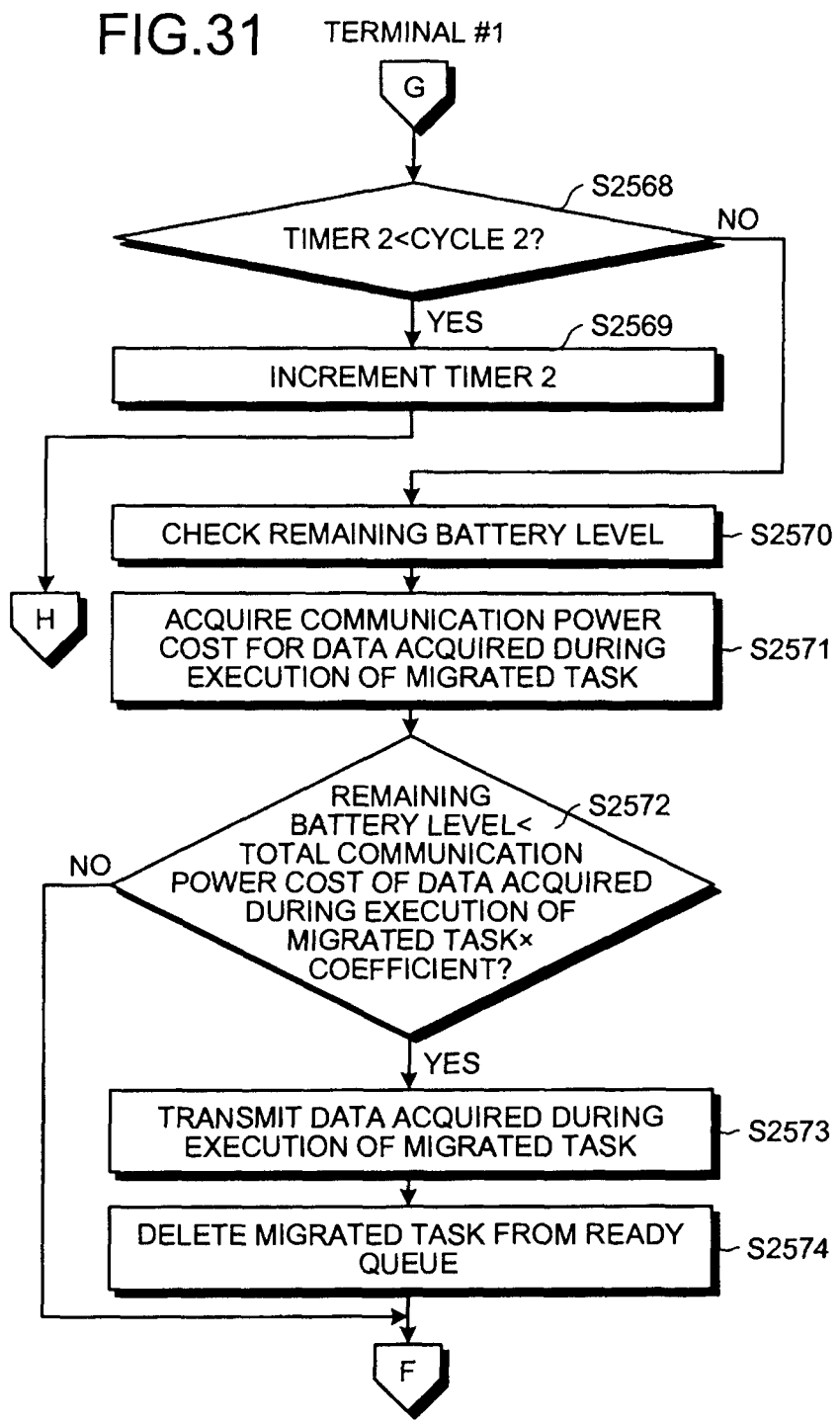

COMPUTER PRODUCT, CONTROL APPARATUS, AND CONTROL METHOD

CROSS REFERENCE TO RELATED APPLICATIONS

This application is a continuation application of International Application PCT/JP2010/063332, filed on Aug. 5, 2010 and designating the U.S., the entire contents of which are incorporated herein by reference.

FIELD

The embodiment discussed herein is related to a control program, a control apparatus, and a control method that control task execution.

BACKGROUND

Distributed processing technology via wireless communication between terminals is conventionally used. For example, terminals such as mobile telephones are battery-driven systems and consequently, if the battery becomes exhausted while distributed processing via wireless communication is under execution, the processing cannot be continued. Thus, technology is known that based on the remaining battery level of each terminal, determines the terminals to which processes are to be assigned (e.g., refer to Japanese Laid-Open Patent Publication Nos. 2005-141669 and 2006-246202). For example, control is performed such that a terminal having a battery level that is less than or equal to a threshold is not assigned a process.

Nonetheless, with the conventional technologies, since the determination of the remaining battery level is performed only at the time of process assignment, even if the remaining battery level only slightly exceeds the threshold, a process is assigned based on the load of the terminal. In other words, a terminal having a central processing unit (CPU) of a high computing capacity is assigned a significant portion of the processes. Consequently, the problems of high power consumption and rapid depletion of the battery power arise.

During distributed processing, if the terminals execute tasks unrelated to the distributed processing, the battery may become exhausted consequent to the execution of the tasks and thus, completion of the task assigned for the distributed processing cannot be guaranteed.

SUMMARY

According to an aspect of an embodiment, a computer-readable recording medium stores a control program that causes a processor of a first terminal to execute a process. The process includes detecting that a remaining battery level of the first terminal has become less than or equal to a first threshold while a task is under execution by the first terminal; suspending execution of the task when the remaining battery level of the first terminal is detected to have become less than or equal to the first threshold; transmitting to a second terminal that is capable of communicating with the first terminal and when the remaining battery level of the first terminal is detected to have become less than or equal to the first threshold, identification information of the task; receiving from the second terminal and after the identification information of the task is transmitted, information related to a potential of executing the task; and transmitting to the second terminal, information corresponding to the information related to the potential of executing the task.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram of a table 400;
FIG. 5 is a diagram of a table 500;
FIG. 6 is a diagram of one example of a task constraint table 600;
FIG. 7 is a diagram of one example of a power control table 700;
FIG. 8 is a diagram of a power cost table 800;
FIG. 11 is a diagram of a task table 1100 in the example of FIG. 10;
FIG. 12 is a diagram of a task table 1200 in another example of FIG. 10;
FIG. 17 is a diagram of the task table 1100 in the example of FIG. 16;
FIG. 18 is a diagram of the task table 1200 in the example of FIG. 16;
FIGS. 25, 26, 27, 28, 29, 30, and 31 are flowcharts of a control procedure of the control apparatus.

DESCRIPTION OF EMBODIMENTS

Preferred embodiments of a control program, a control apparatus, and control method according to the present invention will be explained with reference to the accompanying drawings.

Figure 1:
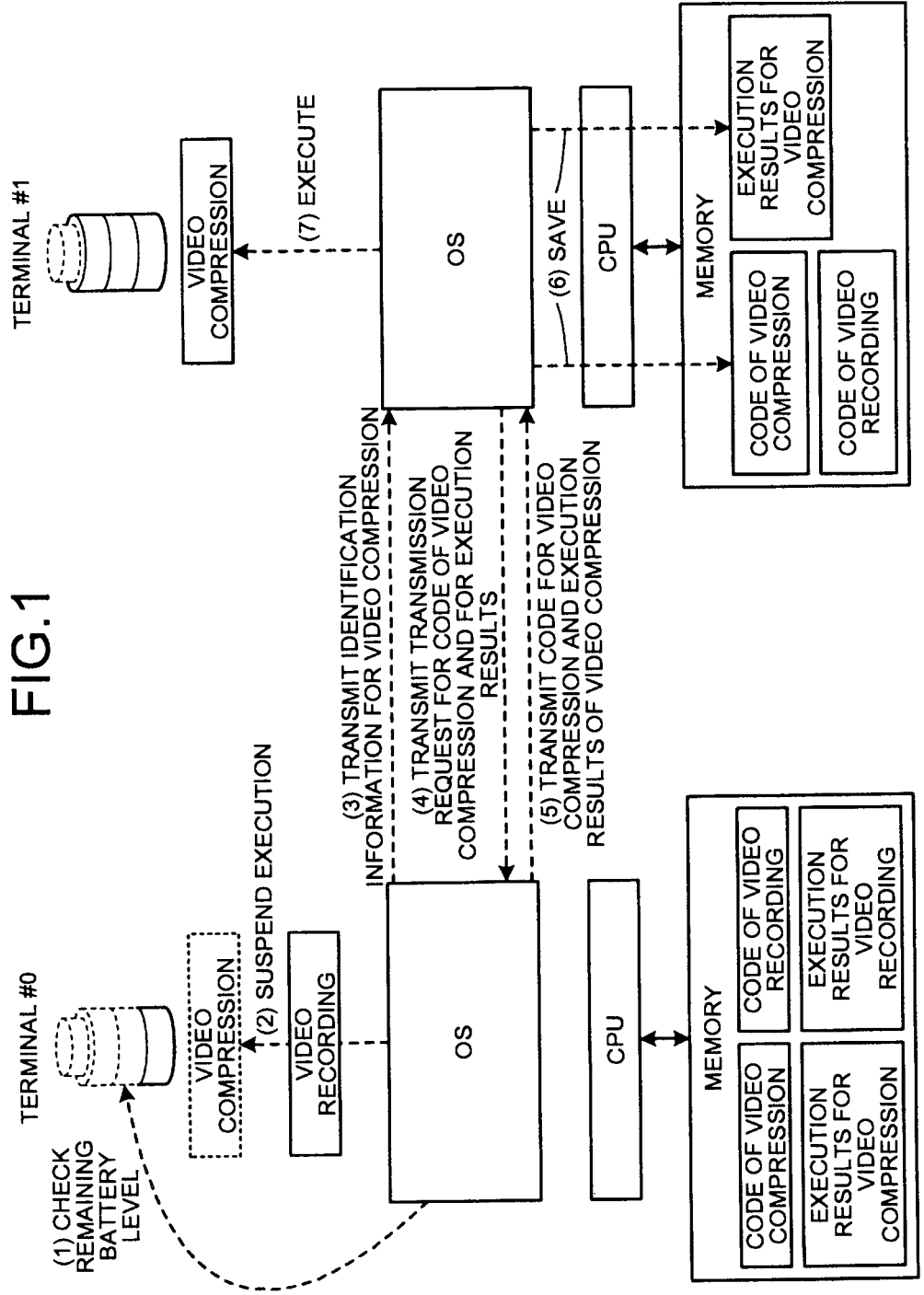
FIG. 1 is a diagram of one example of the present invention.

FIG. 1 is a diagram of one example of the present invention. The operating system (OS) of terminal #0, while video compression and video recording are under execution by terminal #0, (1) checks the remaining battery level of terminal #0 at given intervals to thereby detect that the remaining battery level has become less than or equal to a threshold. The OS of terminal #0, upon detecting that the remaining battery level has become less than or equal to the threshold, for example, (2) suspends the execution of the video compression, among the video compression and the video recording. Although in the present example, the execution of the video compression alone is suspended and migrated, the execution of the video recording may also be simultaneously suspended and migrated.

The OS of terminal #0 (3) transmits identification information for the video compression to terminal #1, which is capable of wirelessly communicating with terminal #0. The OS of terminal #1 searches memory for video compression code, based on the identification information of the video compression. In this example, video compression code is assumed to not be retrieved. The OS of terminal #1 (4) transmits to terminal #0, a transmission request for the video compression code and for execution results of the video compression. The OS of terminal #0, upon receiving the transmission request for the video compression code and for the execution results of the video compression, determines that terminal #1 is capable of executing the video compression, and (5) transmits to terminal #1, the video compression code and the execution results of the video compression.

The OS of terminal #1, upon receiving the video compression code and the execution results of the video compression, determines that an execution instruction for the video compression has been received. The OS of terminal #1 (6) saves the video compression code and the execution results of the video compression to memory and (7) executes the video compression.

Figure 2:
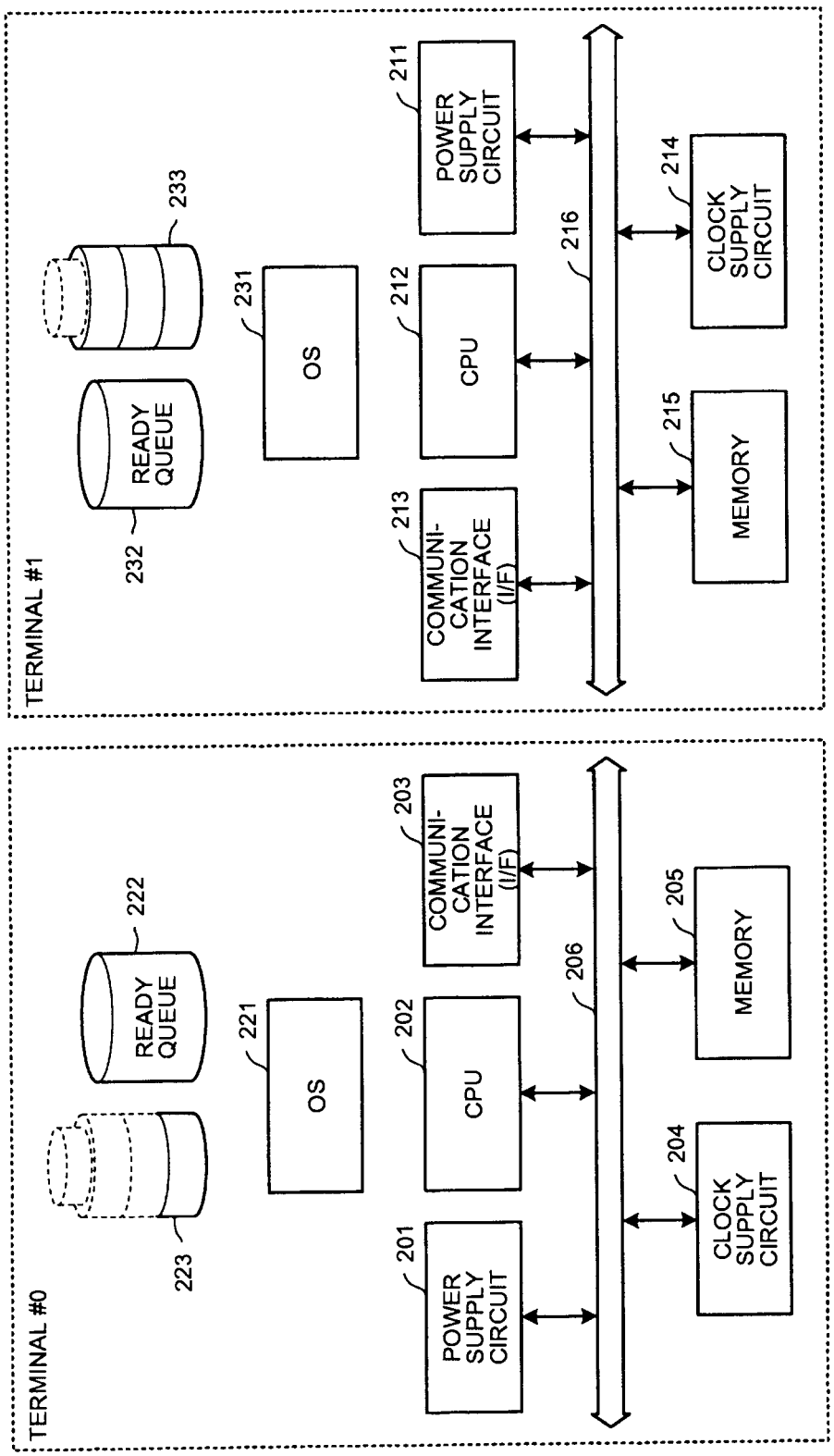
FIG. 2 is a block diagram of the hardware of terminals.

FIG. 2 is a block diagram of the hardware of the terminals. In FIG. 2, terminal #0 and terminal #1 are respectively control apparatuses. Terminal #0 includes a power supply circuit 201, a CPU 202, a communication interface (I/F) 203, a clock supply circuit 204, and memory 205, respectively connected by a bus 206. Terminal #1 includes a power supply circuit 211, a CPU 212, a communication I/F 213, a clock supply circuit 214, and memory 215, respectively connected by a bus 216.

The CPUs 202 and 212 govern overall control of the terminals #0 and #1. The CPU 202 executes an OS 221 having the control program. The OS 221 further has a ready queue 222 to sequentially execute tasks assigned to the CPU 202. The ready queue 222 includes tasks awaiting execution and, for example, from the ready queue 222, the OS 221 sequentially removes and executes tasks. The OS 221 executes an application program interface (API) 223 that monitors the remaining battery level of terminal #0, whereby the OS 221 is able to check the remaining battery level.

An OS 231 has a ready queue 232 to sequentially execute tasks assigned to the CPU 212. The ready queue 232 includes tasks awaiting execution and, for example, from the ready queue 232, the OS 231 sequentially removes and executes tasks. The OS 231 executes an API 233 that monitors the remaining battery level of terminal #1, whereby the OS 231 is able to check the remaining battery level. In the present embodiment, the capacities of the respective batteries of terminal #0 and of terminal #1 are equivalent.

The power supply circuit 201 supplies power to each component in terminal #0. The power supply circuit 201 has registers and based on the values set in the registers, the supply voltage provided to the components can be changed. For example, it is assumed that the register handling the value of the supply voltage provided to the CPU 202 is a 2-bit register and according to the value set in the register, the value of the supply voltage can be selected from among 0.4[V], 0.6[V], 0.8[V], and 1.1[V]. Therefore, to set the supply voltage to be provided to the power supply circuit 201 as 0.4[V], the OS 221 sets the register handling the supply voltage of the CPU 202 to a value corresponding to 0.4[V].

The clock supply circuit 204 supplies clocks to the components in terminal #0. The clock supply circuit 204 has registers and based on the values set in the registers, the frequency of the clocks provided to the components can be changed. For example, the register handling the frequency of the clock provided to the CPU 202 is a 2-bit register.

The frequency of the clock provided to the CPU 202 is selected by the value set in the register handling the frequency of the clock provided to the CPU 202. For example, the frequency of the clock can be selected from among 100[%], 70[%], 50[%], and 30[%] of the frequency defined by the specifications for the CPU 202. To set the clock supply circuit 204 to provide a clock of a frequency that is 30[%] of the frequency defined by the specifications for the CPU 202, the OS 221 sets the register to a value corresponding to 30[%].

The power supply circuit 211 supplies power to each component in terminal #1. The power supply circuit 211 has a configuration identical to that of the power supply circuit 201 and description thereof is omitted. The clock supply circuit 214 supplies clocks to the components in terminal #1. The clock supply circuit 214 has a configuration identical to that of the clock supply circuit 204 and description thereof is omitted.

The communication I/Fs 203 and 213 can perform wireless communication by, for example, ad hoc communication.

The memory 205 and the memory 215 include, for example, read-only memory (ROM), random access memory (RAM), flash ROM, etc. For example, flash ROM stores a boot program; ROM stores application software; and RAM is used as a work area of the CPUs of the terminals #0 and #1. Programs stored in the memory 205 and the memory 215 are loaded onto the CPUs 202 and 212, whereby coded processing is executed by the CPUs 202 and 212.

Figure 3:
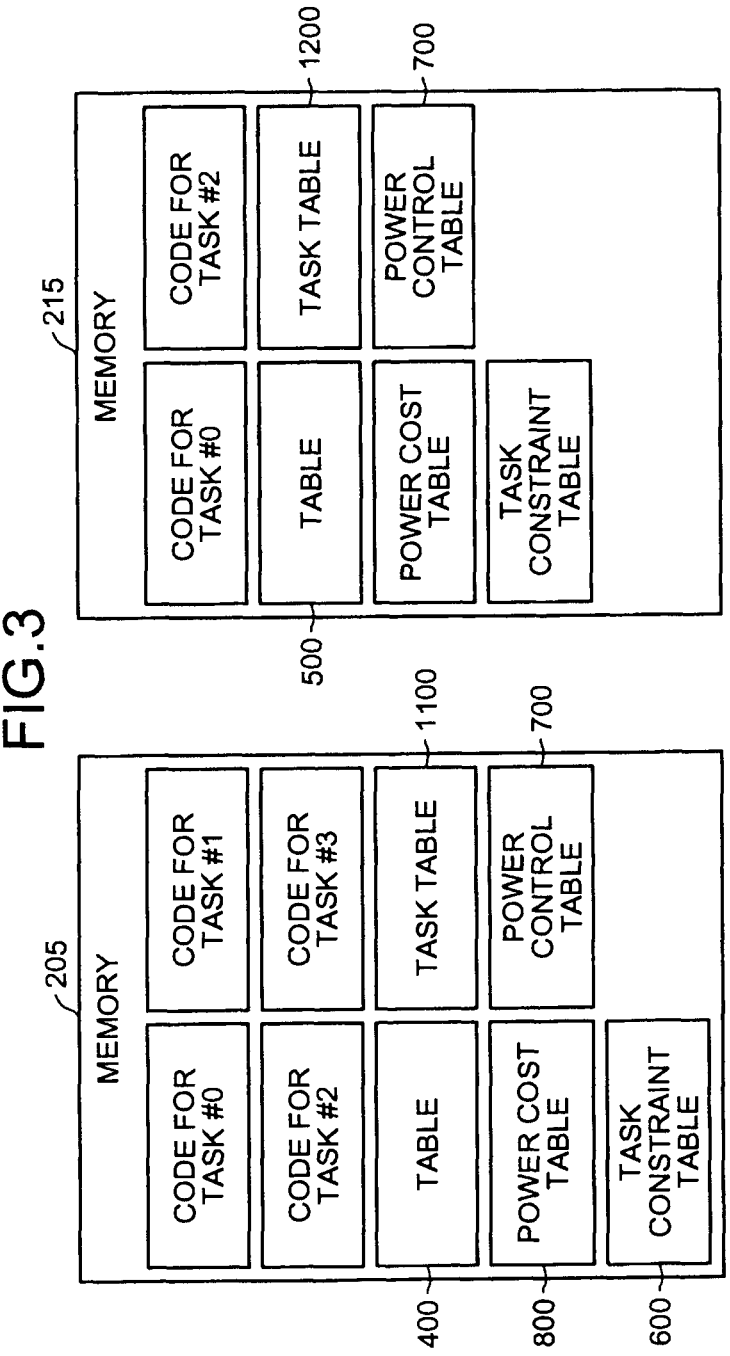
FIG. 3 is a diagram of an example of data stored in memory.

FIG. 3 is a diagram of an example of data stored in memory. The memory 205 stores code for tasks #0 to #3, a table 400, a task constraint table 600, a power control table 700, a power cost table 800, and a task table 1100. The memory 215 stores code for tasks #0 and #2, a table 500, the power control table 700, a task table 1200, a task constraint table, and a power cost table.

FIG. 4 is a diagram of the table 400. The table 400 has an authorized terminal field 401 and a migration-destination terminal field 402. The authorized terminal field 401 retains identification information of a terminal that authorizes assignment. Information is entered into the authorized terminal field 401 by the user of the terminal. The migration-destination terminal field 402 retains the identification information that is entered by the OS 221 and of a terminal that is a migration destination to which the task under execution or a task in the ready queue 222 is to be migrated when the remaining battery level becomes low or moderate.

FIG. 5 is a diagram of the table 500. The table 500 has an authorized terminal field 501 and a migration-destination terminal field 502. The authorized terminal field 501 retains identification information of a terminal that authorizes assignment. Information is entered into the authorized terminal field 501 by the user of the terminal. The migration-destination terminal field 502 retains identification information that is entered by the OS 231 and of a terminal that is a migration destination to which the task under execution or a task in the ready queue 232 is to be migrated when the remaining battery level becomes low or moderate.

FIG. 6 is a diagram of one example of the task constraint table 600. The task constraint table 600 has a task identification information field 601, a real-time constraint field 602, and a frequency field 603. The task identification information field 601 retains identification information of a task for which terminal #0 has code. The real-time constraint field 602 retains a real-time constraint. A real-time constraint is a constraint dictating within how many [ms] the execution of the task is to be completed. "-" indicates that no real-time constraint is defined.

The frequency field 603 retains information indicating what percentage of the clock frequency defined by the specifications of the CPU 202 is to be provided to the CPU 202. Further, in the case of a real-time constraint, since the frequency is not reduced, when the real-time constraint field 602 is 100 [ms] and 200 [ms], the value of the frequency field 603 is 100[%]. The task constraint table in the memory 215 is a table having the same fields as the task constraint table 600 and having information related to a task for which terminal #1 has code.

FIG. 7 is a diagram of one example of the power control table 700. In the present embodiment, the supply voltage is determined according to the frequency of the clock provided to the CPU 202. Therefore, if the frequency of the clock decreases, the supply voltage also decreases. The power control table 700 has a frequency field 701 and a supply voltage field 702. For example, in the present embodiment, if the frequency of the clock supplied to the CPU 202 is set to 70[%] of the defined frequency, the supply voltage is set as 0.8[V].

FIG. 8 is a diagram of the power cost table 800. The power cost table 800 has, for example, a task identification information field 801, a data size under execution field 802, a code size field 803, a power cost (data acquired during execution) field 804, a power cost field (data acquired during execution+code) field 805, a coefficient field 806, and a per packet communication power cost field 807.

The task identification information field 801 retains identification information of a task. The data size under execution field 802 retains the maximum data size under execution, for the task. The code size field 803 retains the code size of the task. The power cost field 804 retains information indicating the power consumed for transmitting to another terminal, the data acquired during execution of the task. The power cost field 805 retains information indicating the power consumed for transmitting to another terminal, the code of the task and the data acquired during execution of the task.

The coefficient field 806 retains coefficients established by the user. The per packet communication power cost field 807 retains information indicating the power consumed for transmitting 1 packet to another terminal.

Here, the calculation of migration power cost will be described.

migration power cost=packet volume×communication power cost per packet packet volume (data acquired during execution+code)= (task code size+data size under execution)/packet size packet volume (data acquired during execution)=(data size under execution)/packet size The communication power cost per packet is preliminarily set by the user. Assuming 1 packet is 128 bytes, 1 packet is 1024 bits.

1 packet=128 bytes=1024 bits
power consumption per unit time: 2.4 Wh
uplink band speed: 384 [Kbps]

$$\text{communication power cost per packet} = 1024/384K \times (2.4/60/60)$$

$$= 1.78 \times 10^{-6} \ [W]$$

$$= 1.78 \ [\mu W]$$

For example, the data acquired during execution is assumed to be 4 Kbytes, and the communication power cost per packet is assumed to be 1.5 [μW].

migration power cost (transmission of only data acquired during execution)=4×1024/128×1.5=48 [μw]

The task table 1100 and the task table 1200 are information indicating whether tasks assigned to the terminals are under execution. For example, the OS 221, upon receiving an assignment instruction or an execution instruction for a task from another terminal, registers into the task table 1100, each of the tasks for which an instruction is received. A detailed example of the task table 1100 and the task table 1200 will be described hereinafter.

Figure 9:
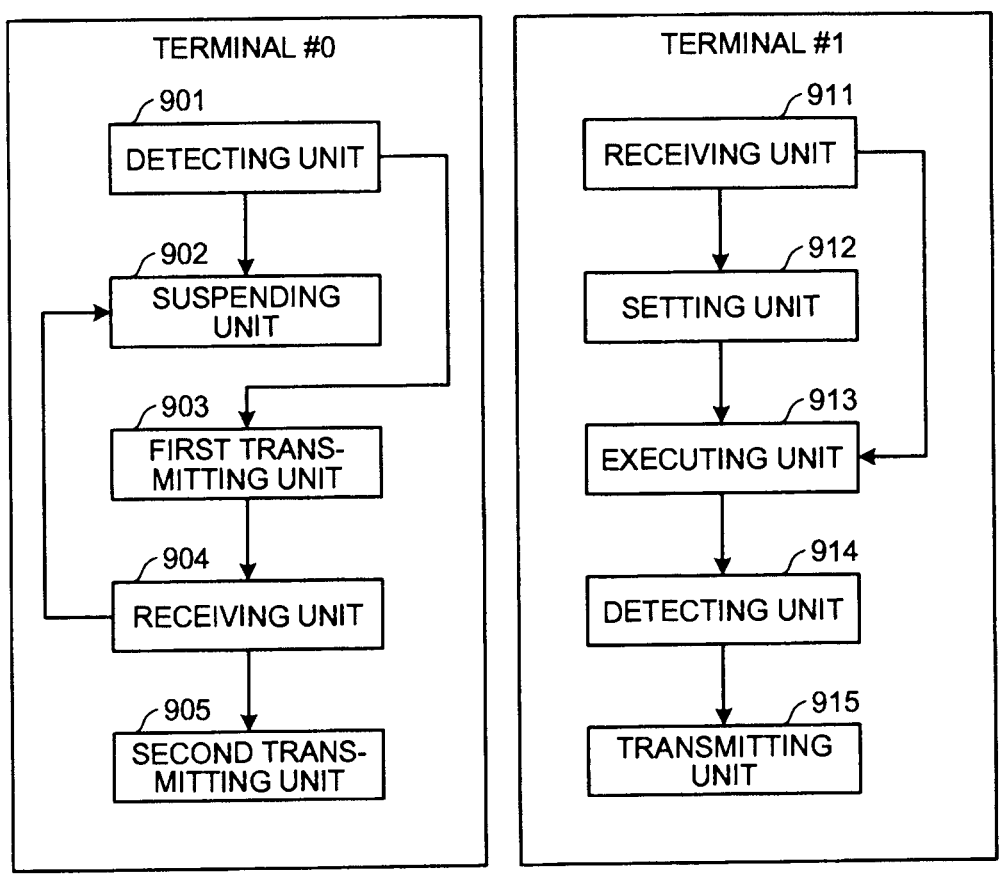
FIG. 9 is a functional diagram of the terminals.

FIG. 9 is a functional diagram of the terminals. In the present embodiment, as an example, terminal #0 will be described as a control apparatus that includes a detecting unit 901, a suspending unit 902, a first transmitting unit 903, a receiving unit 904, and a second transmitting unit 905. The detecting unit 901 to the second transmitting unit 905 have the OS 221, which is stored in the memory 205. The CPU 202 of terminal #0 loads the OS 221 and executes the processing coded in the OS 221, whereby processing by the detecting unit 901 to the second transmitting unit 905 is implemented.

In the present embodiment, as an example, terminal #1 will be described as a control apparatus that includes a receiving unit 911, a setting unit 912, an executing unit 913, a detecting unit 914, and a transmitting unit 915. The receiving unit 911 to the transmitting unit 915 have the OS 231, which is stored in the memory 215. The CPU 212 of terminal #1 loads the OS 231 and executes processing coded in the OS 231, whereby processing by the receiving unit 911 to the transmitting unit 915 is implemented.

The detecting unit 901 detects that the remaining battery level of terminal #0 has become less than or equal to a threshold while a task is under execution by terminal #0.

The suspending unit 902 suspends the execution of the task, if the remaining battery level of terminal #0 is detected to be less than or equal to the threshold by the detecting unit 901.

The first transmitting unit 903, if the remaining battery level of terminal #0 is detected to be less than or equal to the threshold by the detecting unit 901, transmits task identification information to terminal #1, which is capable of communicating with terminal #0.

The receiving unit 904, after the task identification information has been transmitted by the first transmitting unit 903, receives from terminal #1, information related to the potential of executing the task.

The second transmitting unit 905 transmits to terminal #1, information in response to the received information related to the potential of executing the task.

The second transmitting unit 905, if the information related to the potential of executing the task indicates that terminal #1 does not have the code for the task, transmits to terminal #1, the code and an execution instruction for the task.

The second transmitting unit 905, if the information related to the potential of executing the task indicates that terminal #1 has the code for the task, transmits to terminal #1, an execution instruction for the task.

The second transmitting unit 905 further transmits to terminal #1, execution results for the task.

The suspending unit 902 does not suspend the execution of the task, if the information related to the potential of executing the task and received by the receiving unit 904 indicates that the task cannot be executed by terminal #1.

The first transmitting unit 903 does not transmit the task identification information to terminal #1, even if the remaining battery level of terminal #0 is detected to be less than or equal to the threshold by the detecting unit 901, when the task has an execution time limit from the start of execution. Herein, the execution time limit from the start of the execution of the task is referred to as a real-time constraint.

The suspending unit 902 does not suspend the execution of the task, even if the remaining battery level of terminal #0 is detected to be less than or equal to the threshold by the detecting unit 901, when the task has a real-time constraint.

The detecting unit 901 detects that the remaining battery level has become less than or equal to another threshold that is less than the threshold.

The first transmitting unit 903 transmits the task identification information to terminal #1, even if the task has a real-time constraint, when the remaining battery level is detected to be less than or equal to the other threshold by the detecting unit 901. Hereinafter, the threshold is referred to as threshold 1 and the other threshold is referred to as threshold 2.

In the present embodiment, when the remaining battery level of terminal #0 is less than or equal to threshold 2, the remaining battery level of terminal #0 is set as low and when the remaining battery level of terminal #0 is greater than threshold 2 and less than or equal to threshold 1, the remaining battery level of terminal #0 is set as moderate.

The receiving unit 911 receives from terminal #0, an execution instruction for the task and transmitted to terminal #1.

The executing unit 913 executes the task for which the execution instruction is received by the receiving unit 911.

The detecting unit 914 detects that the remaining battery level of terminal #1 has become less than or equal to a threshold while the task is under execution by the executing unit 913. In the present embodiment, the threshold is determined based in the migration power cost.

The transmitting unit 915 transmits to terminal #0, execution results for the task, if the remaining battery level is detected to be less than or equal to the threshold by the detecting unit 914.

The setting unit 912 sets the supply source of the clock to the CPU 212 of terminal #1 to provide a clock of a frequency corresponding to the task for which the execution instruction is received by the receiving unit 911, if the task has no execution time limit from the start of execution of the task.

The setting unit 912 sets the supply source of the supply voltage to the CPU 212 of terminal #1 to provide a supply voltage of a value according to the task for which the execution instruction is received by the receiving unit 911, if the task has no execution time limit from the start of execution of the task.

The executing unit 913, after the setting by the setting unit 912, executes the task for which the execution instruction is received.

In light of the aforementioned, description will be given in detail with reference to the accompanying drawings.

Figure 10:
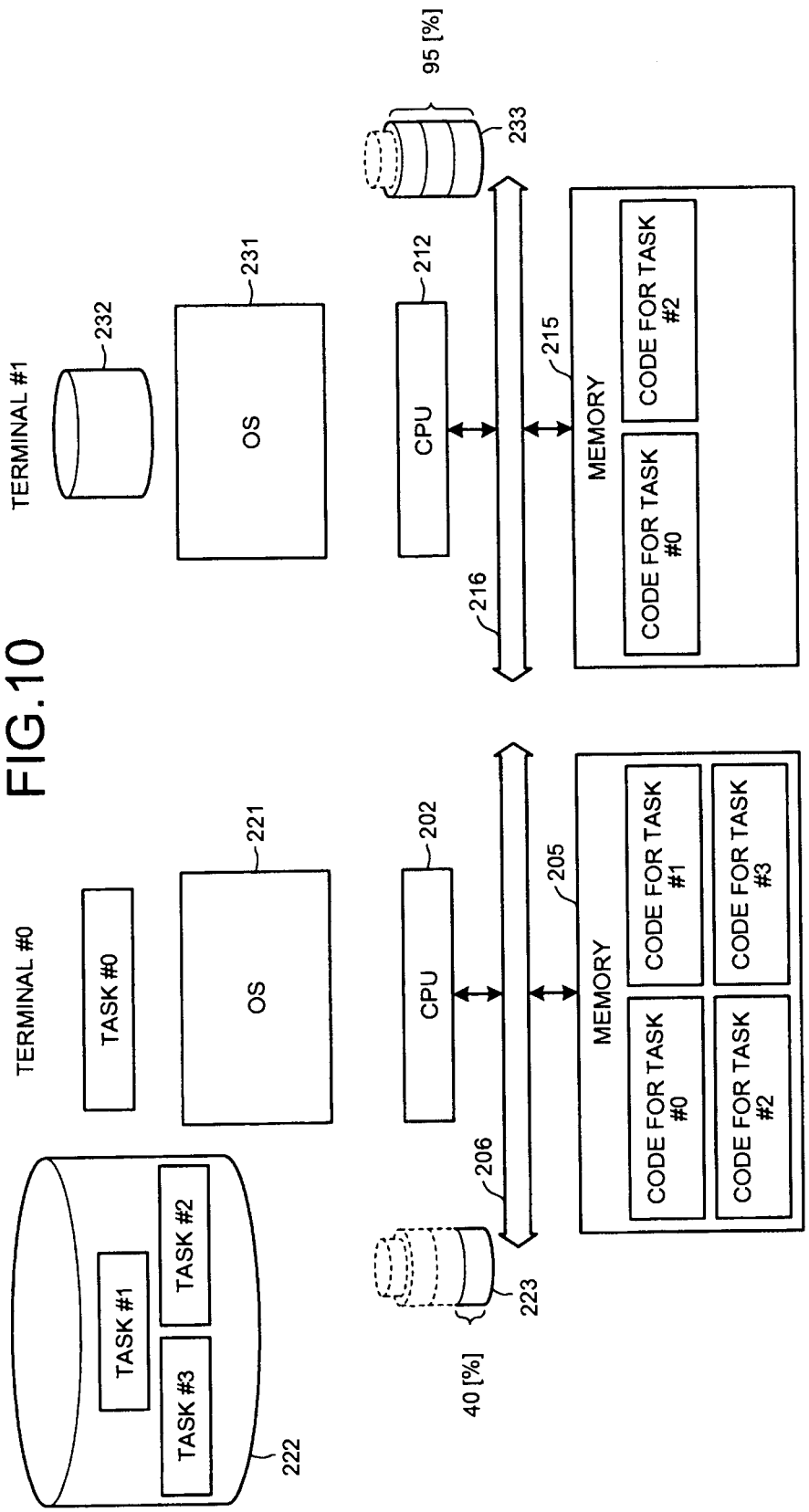
FIG. 10 is a diagram of an example of a task under execution by terminal #0.

FIG. 10 is a diagram of an example of a task under execution by terminal #0. Tasks #0 to #3 are assigned to terminal #0. Tasks #1 to #3 are registered in the ready queue 222. Task #0 is under execution by the OS 221. The remaining battery level of terminal #0 is 40[%] of the battery capacity of terminal #0; and the remaining battery level of terminal #1 is 95[%] of the battery capacity of terminal #1.

FIG. 11 is a diagram of the task table 1100 in the example of FIG. 10. The task table 1100 has a task identification information field 1101, an assignment-source terminal field 1102, and a state field 1103. The task identification information field 1101 retains identification information of a task. The assignment-source terminal field 1102 retains identification information of a terminal that is the assignment source of the task. The state field 1103 retains information indicating the state of the task. The state of the task includes 3 states: under execution, queued, and migration.

In the example of FIG. 10, task #0 is under execution, tasks #1 to #3 are registered in the ready queue 222 and consequently, tasks #1 to #3 are in queued. The OS 221, upon detecting task switching, updates the state field in the task table 1100. The OS 221, upon detecting completion of the execution of the task, deletes from the task table 1100, description related to the completed task.

FIG. 12 is a diagram of the task table 1200 in another example of FIG. 10. The task table 1200 has a task identification information field 1201, an assignment-source terminal field 1202, and a state field 1203. The task identification information field 1201 retains task identification information. The assignment-source terminal field 1202 retains identification information of a terminal that is the assignment source of the task. The state field 1203 retains information indicating the state of the task. In the example of FIG. 10, none of the tasks have been assigned and therefore, none of the tasks are registered in the task table 1200.

Figure 13:
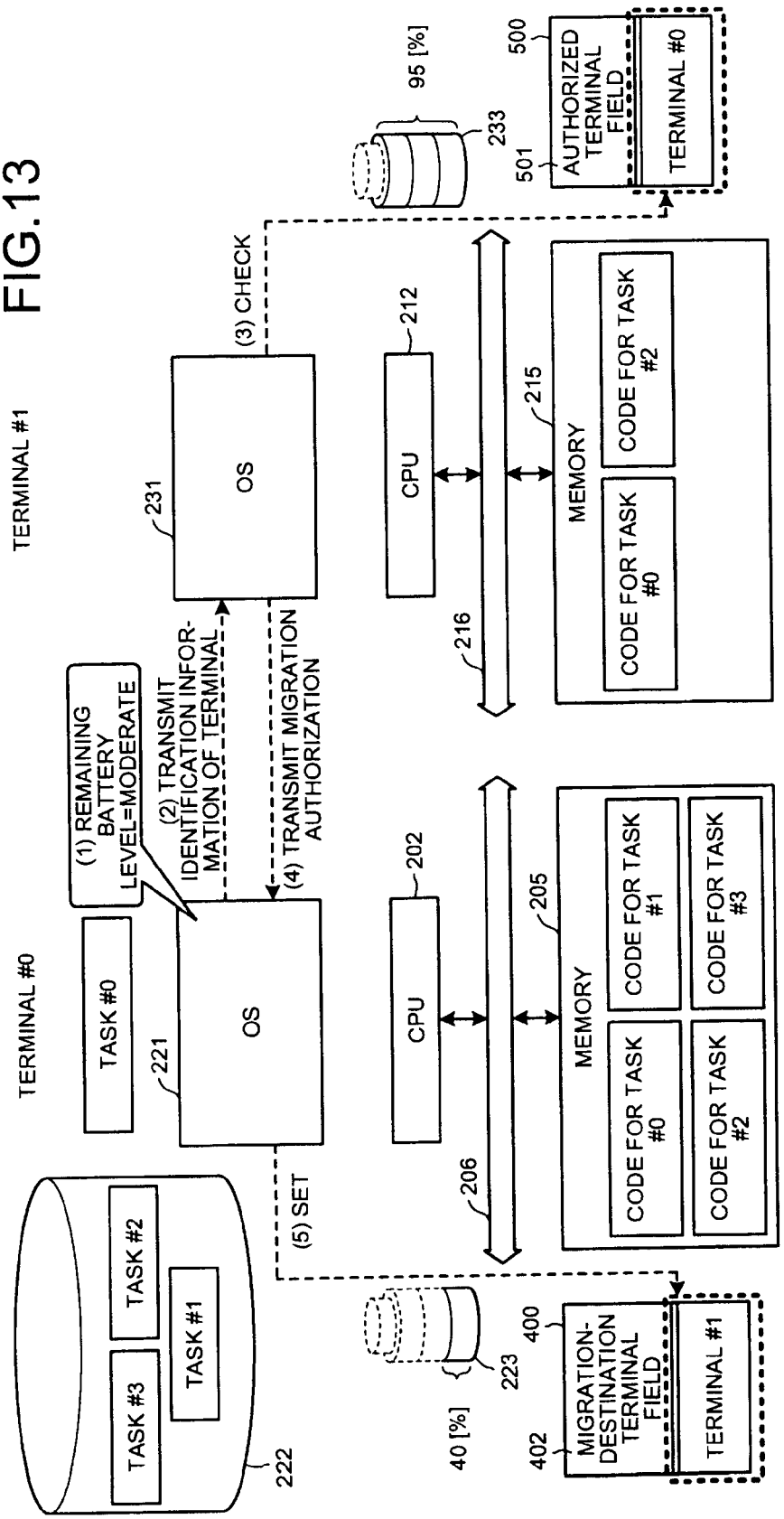
FIG. 13 is a diagram of an example of the remaining battery level of terminal #0 being low.

FIG. 13 is a diagram of an example of the remaining battery level of terminal #0 being low. At the terminals, the OS checks the remaining battery level at given intervals. The OS 221, upon checking the remaining battery level of terminal #0, detects that the remaining battery level is less than or equal to threshold 2 since the remaining battery level is at 40[%] of the battery capacity. The OS 221 (1) sets the remaining battery level of terminal #0 as moderate.

The OS 221 (2) transmits identification information of terminal #0 to terminal #1, via the communication I/F 203. The OS 231, upon receiving the identification information of terminal #1 via the communication I/F 213, (3) searches the authorized terminal field 501 of the table 500 for registration of the identification information of terminal #0. In this example, the identification information of terminal #0 is registered in the authorized terminal field 501 of the table 500. Subsequently, the OS 231 (4) transmits migration authorization to terminal #0 via the communication I/F 213.

The OS 221, upon receiving the migration authorization from terminal #1, (5) enters terminal #1 into the migration-destination terminal field 402 of the table 400.

Figure 14:
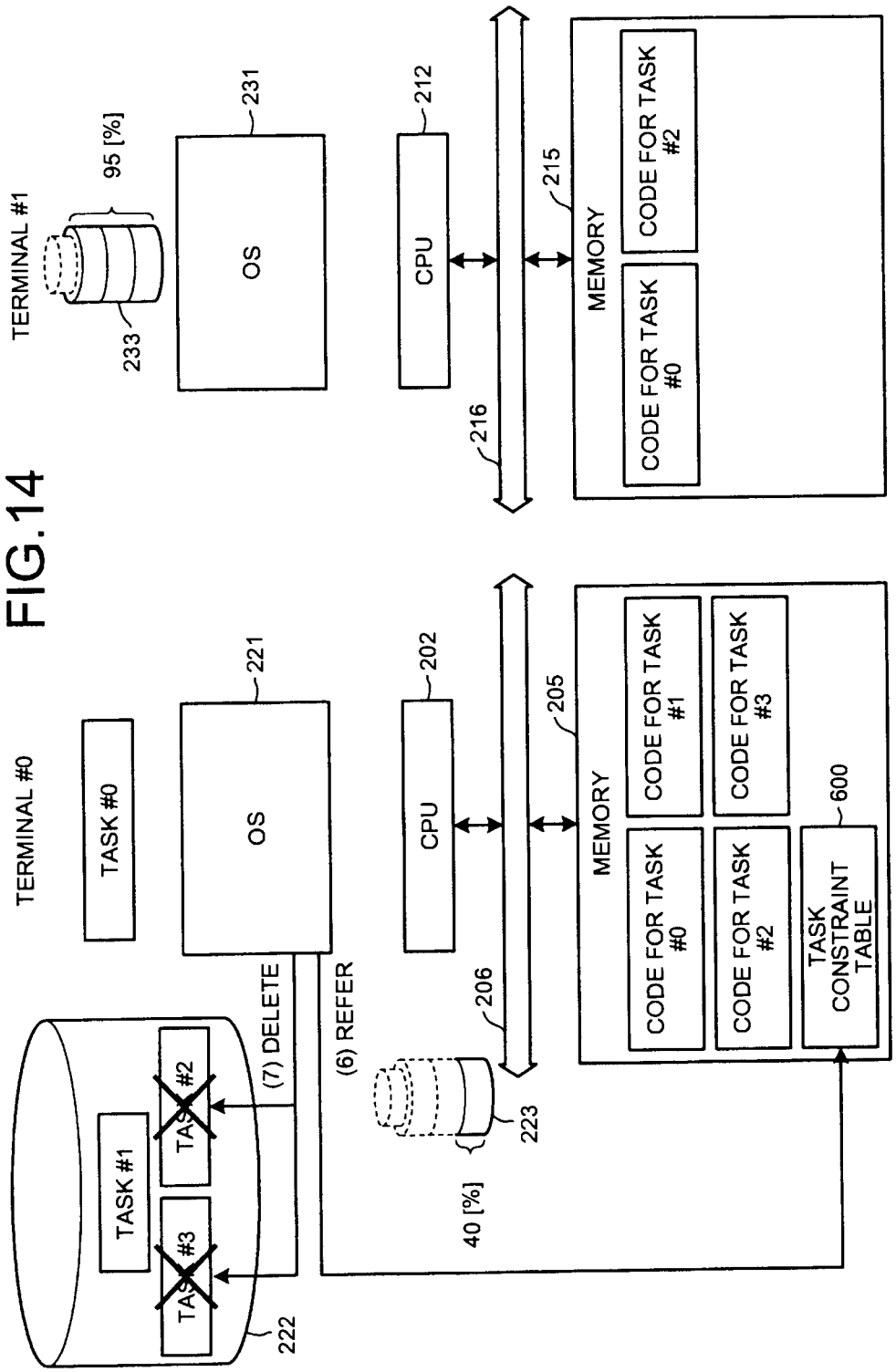
FIG. 14 is a diagram of an example of determining a task to be migrated.

FIG. 14 is a diagram of an example of determining a task to be migrated. The OS 221, from among the tasks assigned to terminal #0, selects tasks for which migration power cost is registered. The OS 221 refers to the power cost table 800 to determine whether the migration power cost of a task is registered. Since the remaining battery level is moderate, the OS 221 regards a task having no real-time constraint among the selected tasks, as a task to be migrated. To determine whether a task has a real-time constraint, the OS 221 (6) can make the determination by referring to the task constraint table 600. In this example, tasks #2 and #3 are to be migrated. The OS 221 (7) deletes tasks #2 and #3 from the ready queue 222.

Figure 15:
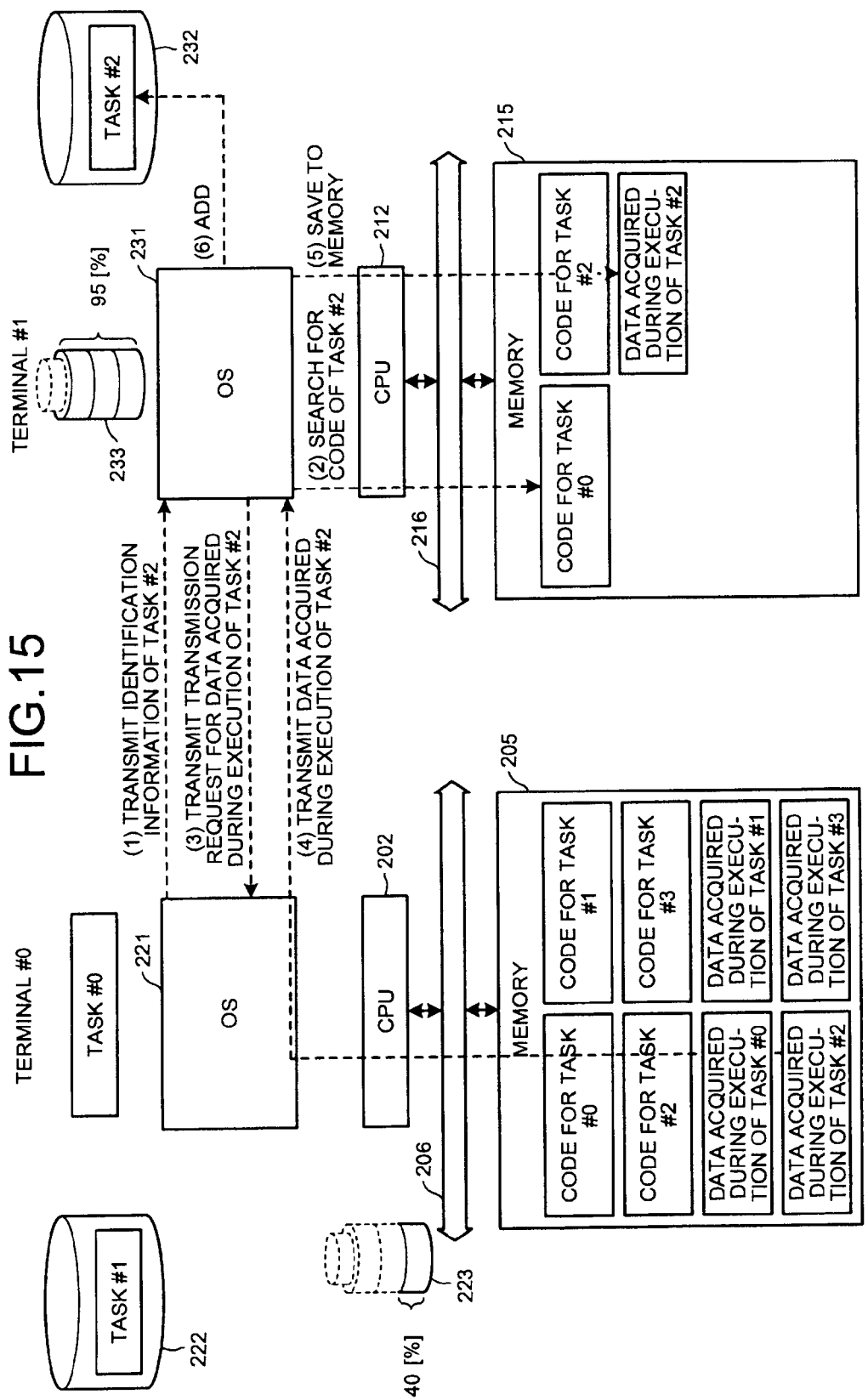
FIG. 15 is a diagram of an example of migration of a task for which a destination terminal has code.

FIG. 15 is a diagram of an example of migration of a task for which the destination terminal has code. The OS 221 (1) transmits identification information of task #2, via the communication I/F 203. The OS 231, upon receiving the identification information of task #2, via the communication I/F 213, (2) searches the memory 215 for code of task #2, based on the identification information of task #2. Since the code of task #2 is stored in the memory 215, the OS 231 (3) transmits to terminal #0, via the communication I/F 213, a transmission request for the data acquired during execution of task #2.

Herein, data acquired during execution are execution results obtained until the time of transmission.

The OS 221, upon receiving the transmission request via the communication I/F 203, (4) transmits to terminal #1, via the communication I/F 203, the data acquired during execution of task #2. Here, the OS 221 simultaneously transmits specification of a clock frequency that can be set during the execution of task #2. The OS 231 receives the data acquired during execution of task #2, via the communication I/F 213, (5) and saves the data to the memory 215. Here, the OS 231 simultaneously receives the specification of a clock frequency that can be set during the execution of task #2 and saves the clock frequency to the memory 215.

The OS 231 (6) adds task #2 to the ready queue 232 and registers into the task table 1200, information related to task #2. Consequently, task #2 is migrated from terminal #0 to terminal #1. The OS 221, via the communication I/F 203, notifies terminal #1 of the completion of migration of task #2. In the task table 1100, the OS 221 changes the state field 1103 related to task #2 to indicate migration.

Figure 16:
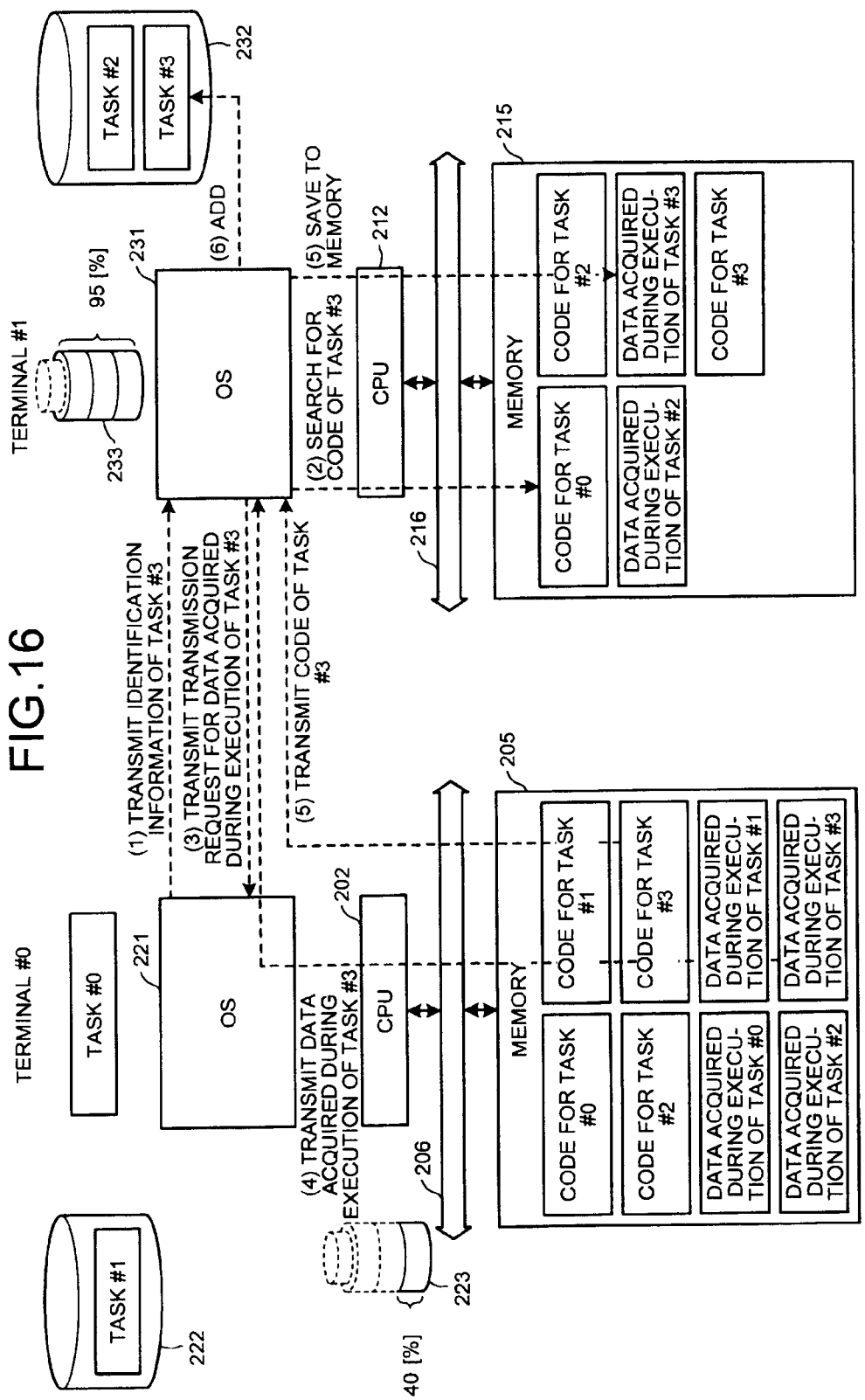
FIG. 16 is a diagram of an example of migration of a task for which the destination terminal does not have code.

FIG. 16 is a diagram of an example of migration of a task for which the destination terminal does not have code. The OS 221 (1) transmits identification information of task #3, via the communication I/F 203. The OS 231, upon receiving the identification information of task #3, via the communication I/F 213, (2) searches the memory 215 for code of task #3. Since the code of task #3 is not stored in the memory 215, the OS 231 (3) transmits to terminal #0, via the communication I/F 213, a transmission request for the code of task #3 and for the data acquired during execution of task #3.

The OS 221, upon receiving the transmission request for the code of task #3 and for the data acquired during execution of task #3, via the communication I/F 203, (4) transmits to terminal #1, via the communication I/F 203, the code of task #3 and the data acquired during execution of task #3. Here, the OS 221 simultaneously transmits specification of a clock frequency that can be set during the execution of task #3. The OS 231 receives the code of task #3 and the data acquired during execution of task #3, via the communication I/F 213, and (5) saves both to the memory 215. Here, the OS 231 simultaneously receives the specification of a clock frequency that can be set during the execution of the task #3 and saves the clock frequency to the memory 215.

The OS 231 (6) adds task #3 to the ready queue 232 and registers into the task table 1200, information related to task #3. Consequently, task #3 is migrated from terminal #0 to terminal #1. The OS 221, via the communication I/F 203, notifies terminal #0 of the completion of migration of task #3. In the task table 1100, the OS 221 changes the state field 1103 related to task #3 to indicate migration. The OS 221, via the communication I/F 203, notifies terminal #1 of the completion of migration for all tasks subject to migration.

FIG. 17 is a diagram of the task table 1100 in the example of FIG. 16. In the task table 1100, migration is entered in the state fields 1103 related to tasks #2 and #3.

FIG. 18 is a diagram of the task table 1200 in the example of FIG. 16. In the task table 1200, information related to tasks #2 and #3 is registered. Taking task #2 as an example, in the assignment-source terminal field 1202, identification information of terminal #0 is retained and in the state field 1203, queued is indicated.

Figure 19:
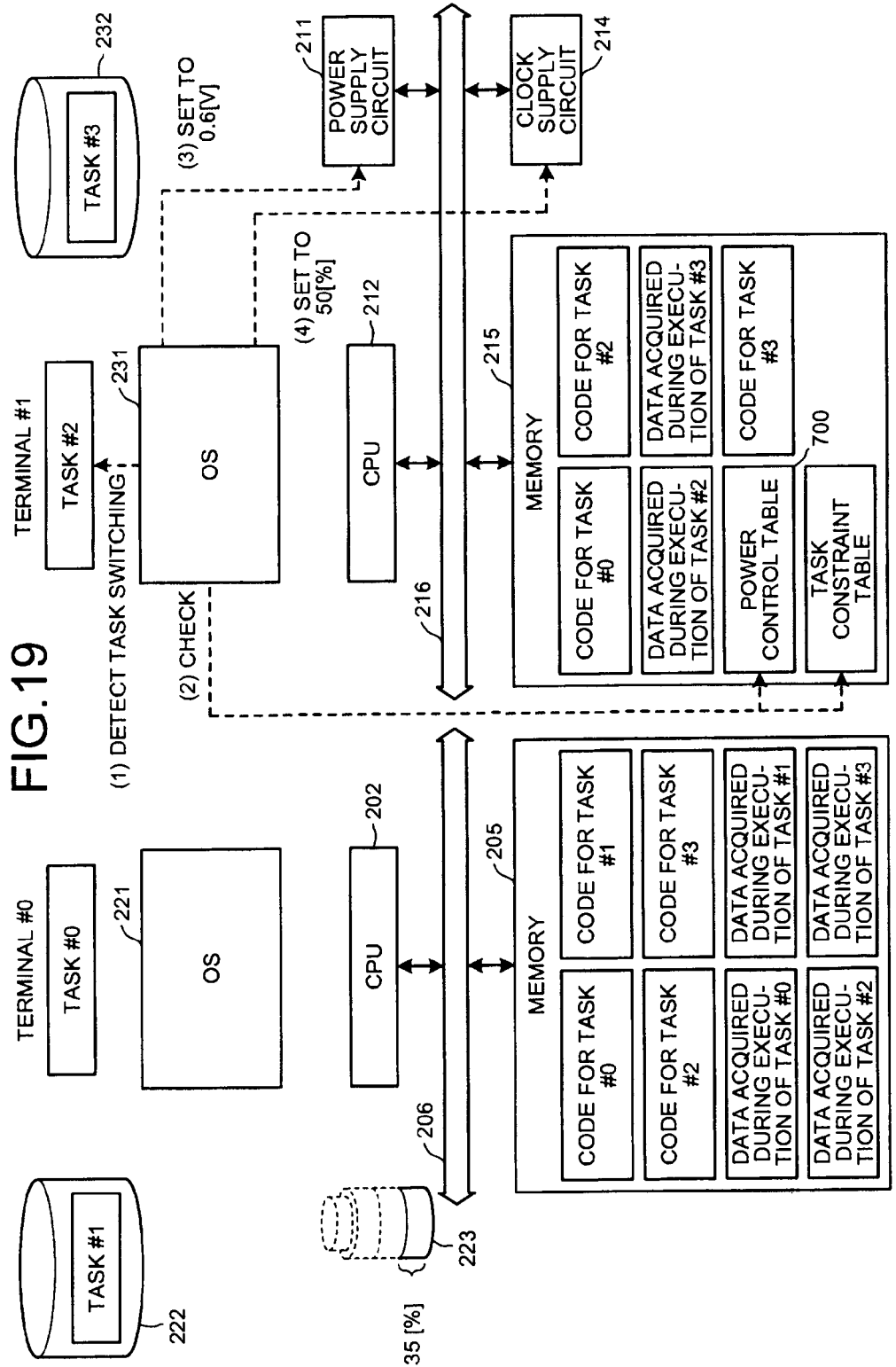
FIG. 19 is a diagram of a first example of task switching.

FIG. 19 is a diagram of a first example of task switching. In this example, at terminal #1, task #2 is under execution consequent to task switching. The OS 231 (1) upon detecting the task switching, (2) determines based on the task constraint table 600, whether task #2, which has been switched to, has a real-time constraint. Since task #2 has no real-time constraint, the OS 231 acquires from the frequency field 603 of the task constraint table 600, the frequency rate for task #2.

The OS 231, based on the acquired frequency rate, acquires a supply voltage from the power control table 700. In this example, since the frequency rate for task #2 is 50[%], the supply voltage is 0.6[V]. The OS 231 (3) sets the power supply circuit 211 to provide a supply voltage of 0.6[V] to the CPU 212. The OS 231 (4) sets the clock supply circuit 214 to supply to the CPU 212, a clock of a frequency that is 50[%] of the frequency defined by the specifications. For example, if the frequency defined by the specifications is 100[MHz], a frequency of 50[MHz] is set to be provided to the CPU 212.

Figure 20:
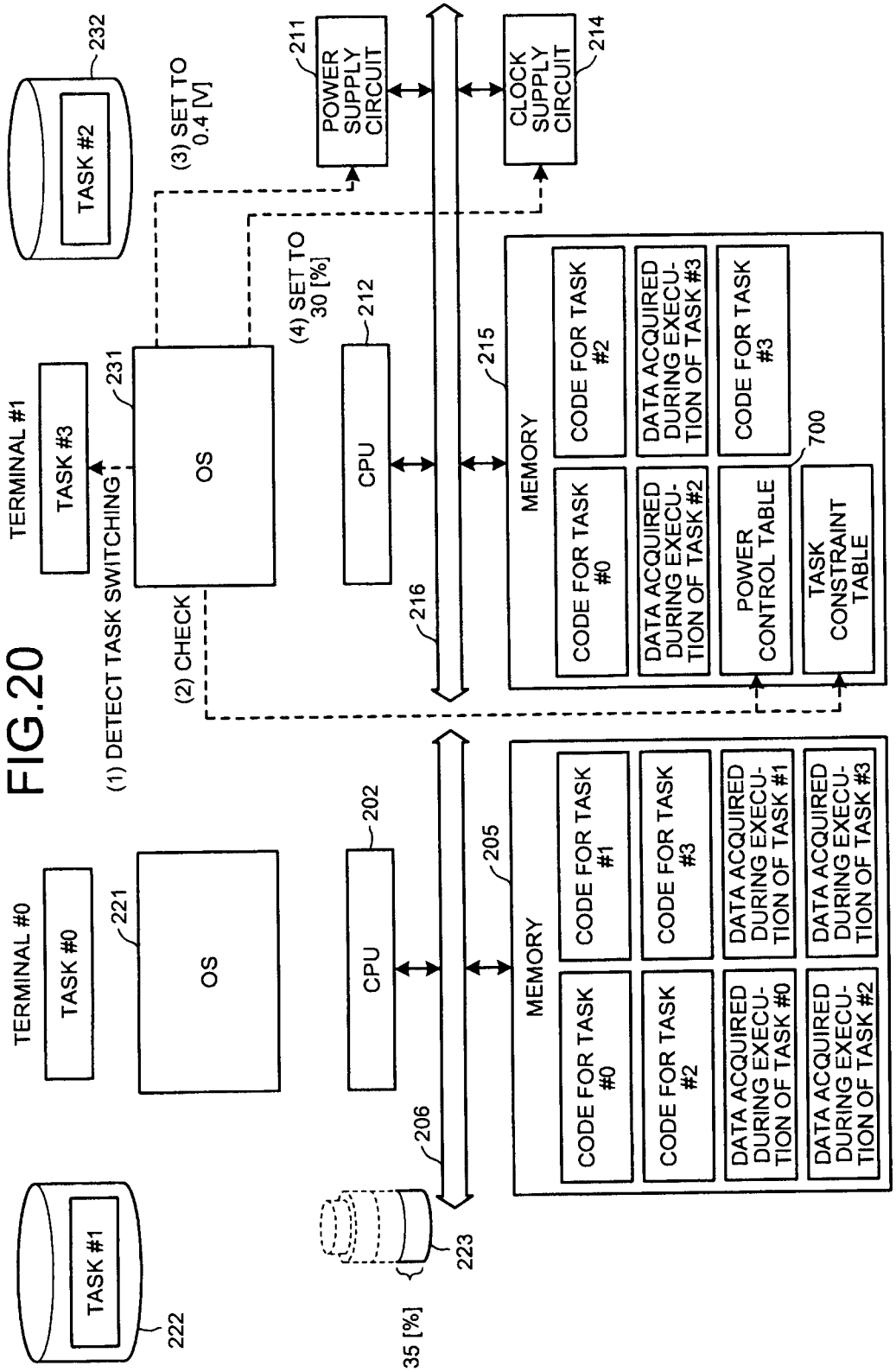
FIG. 20 is a diagram of a second example of task switching.

FIG. 20 is a diagram of a second example of task switching. In this example, at terminal #1, task #3 is under execution consequent to task switching. The OS 231 (1) upon detecting the task switching, (2) determines based on the task constraint table 600, whether task #3, which has been switched to, has a real-time constraint. Since the task constraint table 600 includes no information related to task #3, the OS 231 uses the received frequency rate.

The OS 231, based on the received frequency rate, acquires a supply voltage from the power control table 700. In this example, since the frequency rate for task #3 is 30[0], the supply voltage is 0.4[V]. The OS 231 (3) sets the power supply circuit 211 to provide a supply voltage of 0.4[V] to the CPU 212. The OS 231 (4) sets the clock supply circuit 214 to supply to the CPU 212, a clock of a frequency that is 30[0] of the frequency defined by the specifications.

Figure 21:
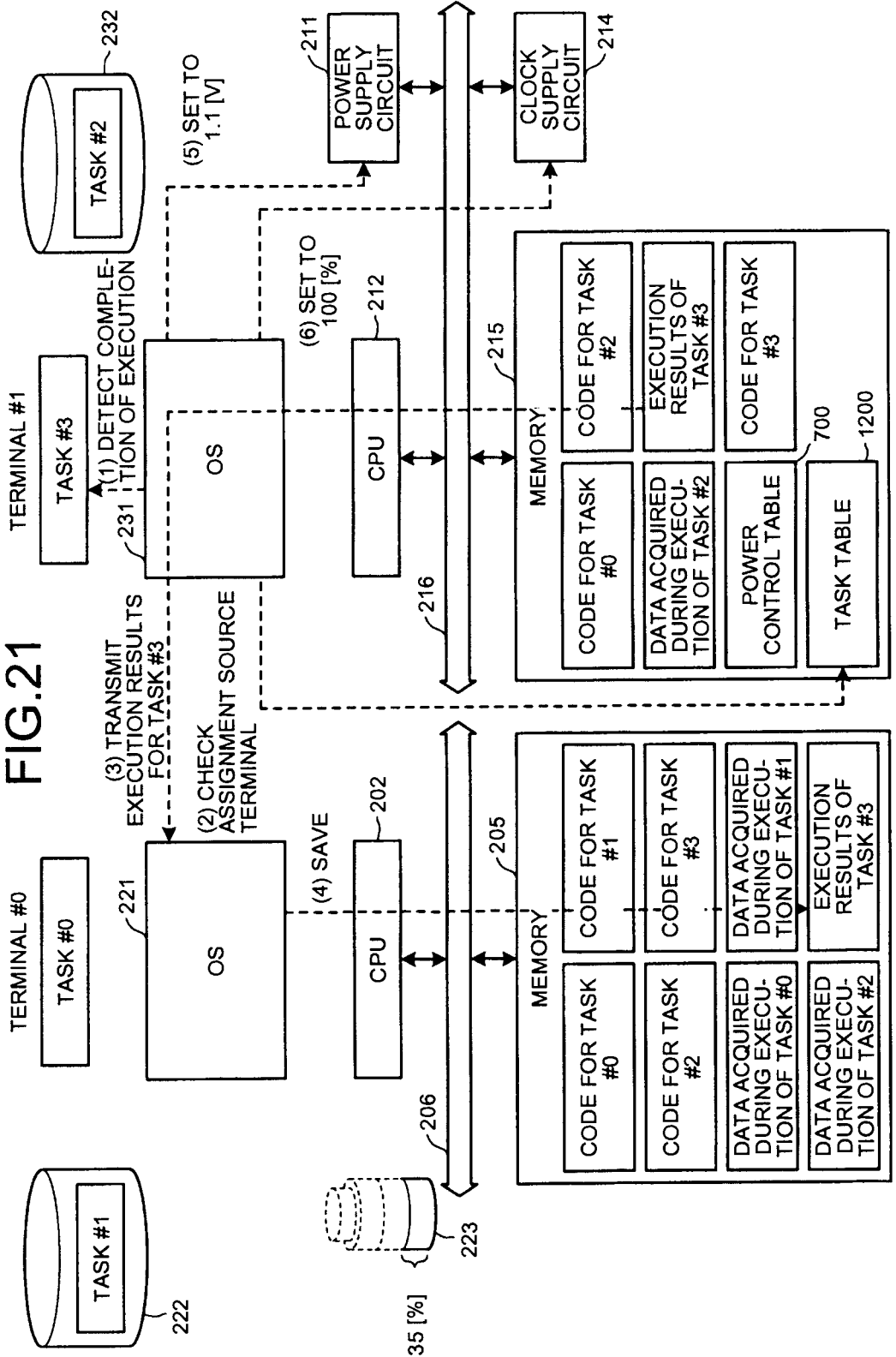
FIG. 21 is a diagram of an example of detection of task completion.

FIG. 21 is a diagram of an example of detection of task completion. The OS 231, (1) upon detecting the completion of task #3, (2) identifies from the task table 1200, the assignment source terminal of task #3. Since the assignment source terminal of task #3 is terminal #0, the OS 231 (3) transmits execution results for task #3 to terminal #0, via the communication I/F 213. The OS 221, upon receiving the execution results for task #3, via the communication I/F 203, (4) saves the execution results for task #3 to the memory 205.

Meanwhile, the OS 231 (5) sets the power supply circuit 211 to supply to the CPU 212, a supply voltage of 1.1[V] and (6) sets the clock supply circuit 214 to supply to the CPU 212, a clock of the maximum frequency defined by the specifications.

Figure 22:
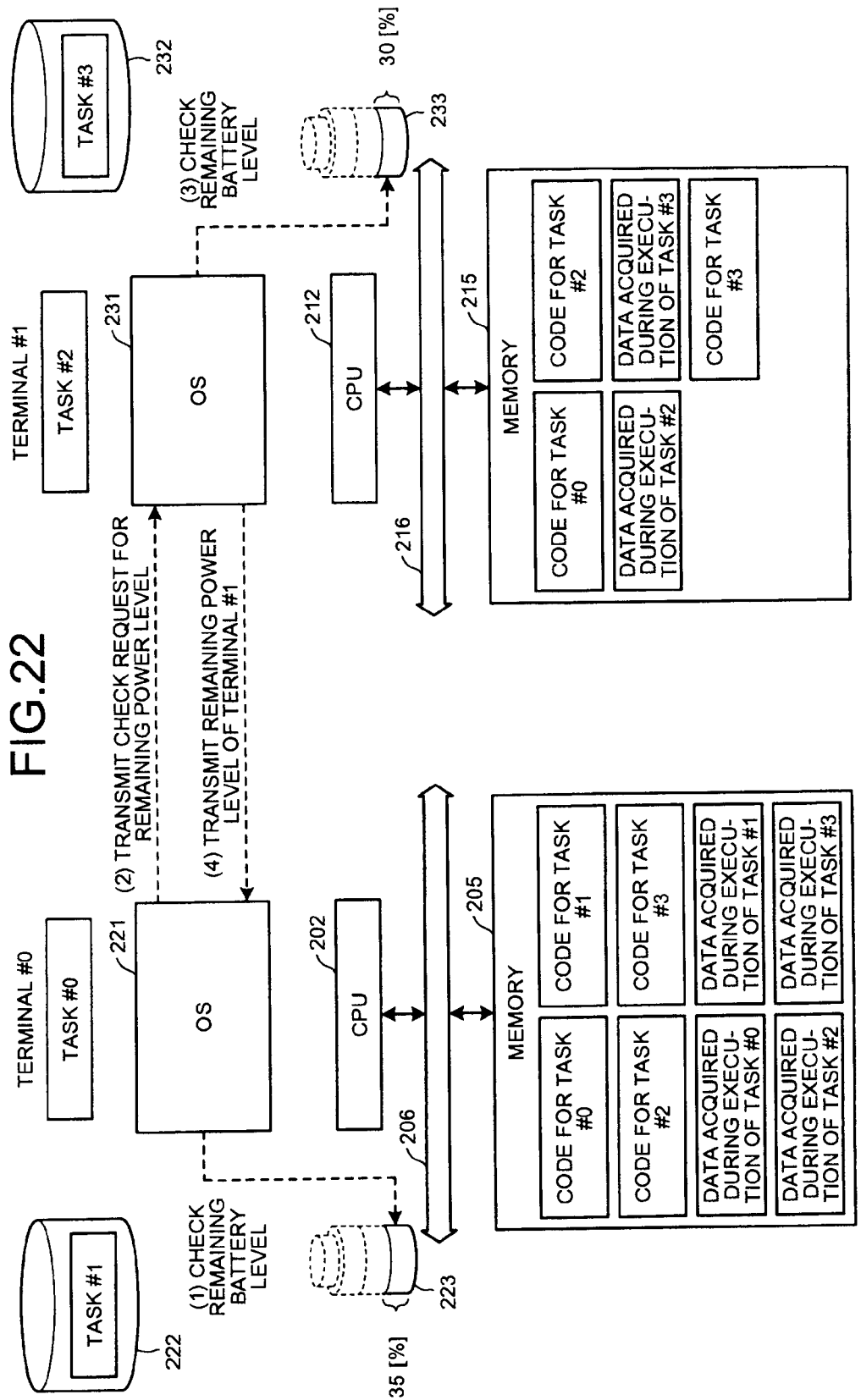
FIG. 22 is a first diagram of an example of checking the remaining battery level of terminal #0 after migration.

FIG. 22 is a first diagram of an example of checking the remaining battery level of terminal #0 after migration. The OS 221 detects a timer interrupt and determines whether a given interval has elapsed. The OS 221, upon determining that the given interval has elapsed, (1) checks the remaining battery level of terminal #0, and (2) transmits to terminal #1, via the communication I/F 203, a check request for the remaining battery level of terminal #1. The OS 231, upon receiving the check request for the remaining battery level, via the communication I/F 213, (3) checks the remaining battery level, and (4) transmits specification of the remaining battery level to terminal #0, via the communication I/F 213.

Figure 23:
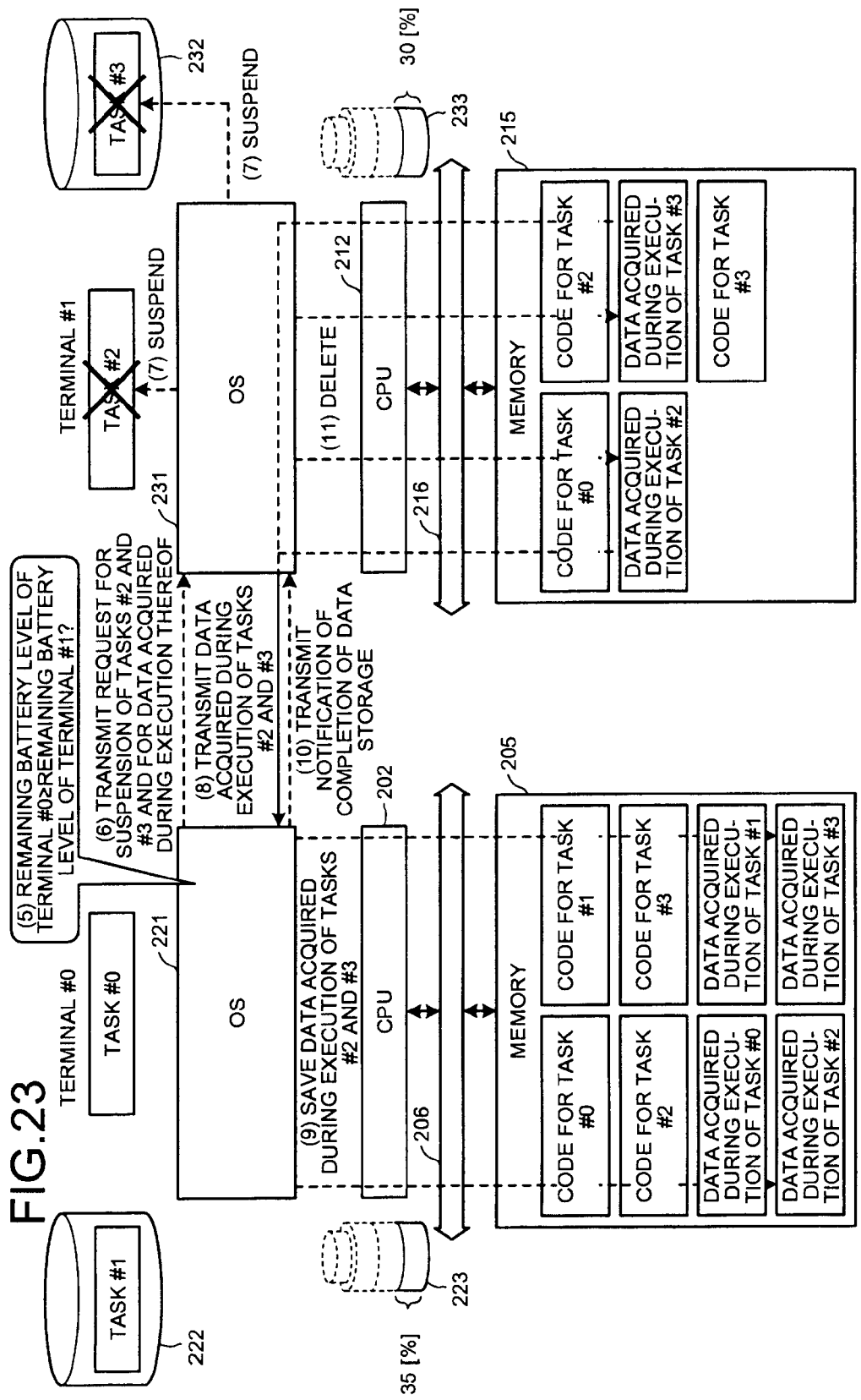
FIG. 23 is a second diagram of an example of checking the remaining battery level of terminal #0 after migration.

FIG. 23 is a second diagram of an example of checking the remaining battery level of terminal #0 after migration. The OS 221 (5) determines if the remaining battery level of terminal #1 is less than or equal to the remaining battery level of terminal #0. In this example, the remaining battery level of terminal #1 is 30[%] and the remaining battery level of terminal #0 is 35[%]; therefore, the remaining battery level of terminal #1 is less than or equal to the remaining battery level of terminal #0. The OS 221 (6) transmits to terminal #1, via the communication I/F 203, a request for suspension of the execution of tasks #2 and #3 and a request for collection of the data acquired during execution of tasks #2 and #3.

The OS 231, upon receiving the request for suspension of tasks #2 and #3 and the request for collection of the data acquired during execution of tasks #2 and #3, (7) suspends the execution of task #2, and deletes task #3 from the ready queue 232 to thereby suspend execution of task #3. The OS 231 (8) transmits to terminal #0, via the communication I/F 213, the data acquired during execution of tasks #2 and #3. The OS 221 receives the data acquired during execution of tasks #2 and #3, via the communication I/F 203, and (9) respectively saves the data acquired during execution to the memory 205.

The OS 221 (10) transmits to terminal #1, via the communication I/F 203, notification that storage of the data acquired during execution has been completed. The OS 231, upon receiving, via the communication I/F 213, the notification that the storage of the data acquired during execution has been completed, (11) deletes from the memory 215, the data acquired during execution of tasks #2 and #3.

Figure 24:
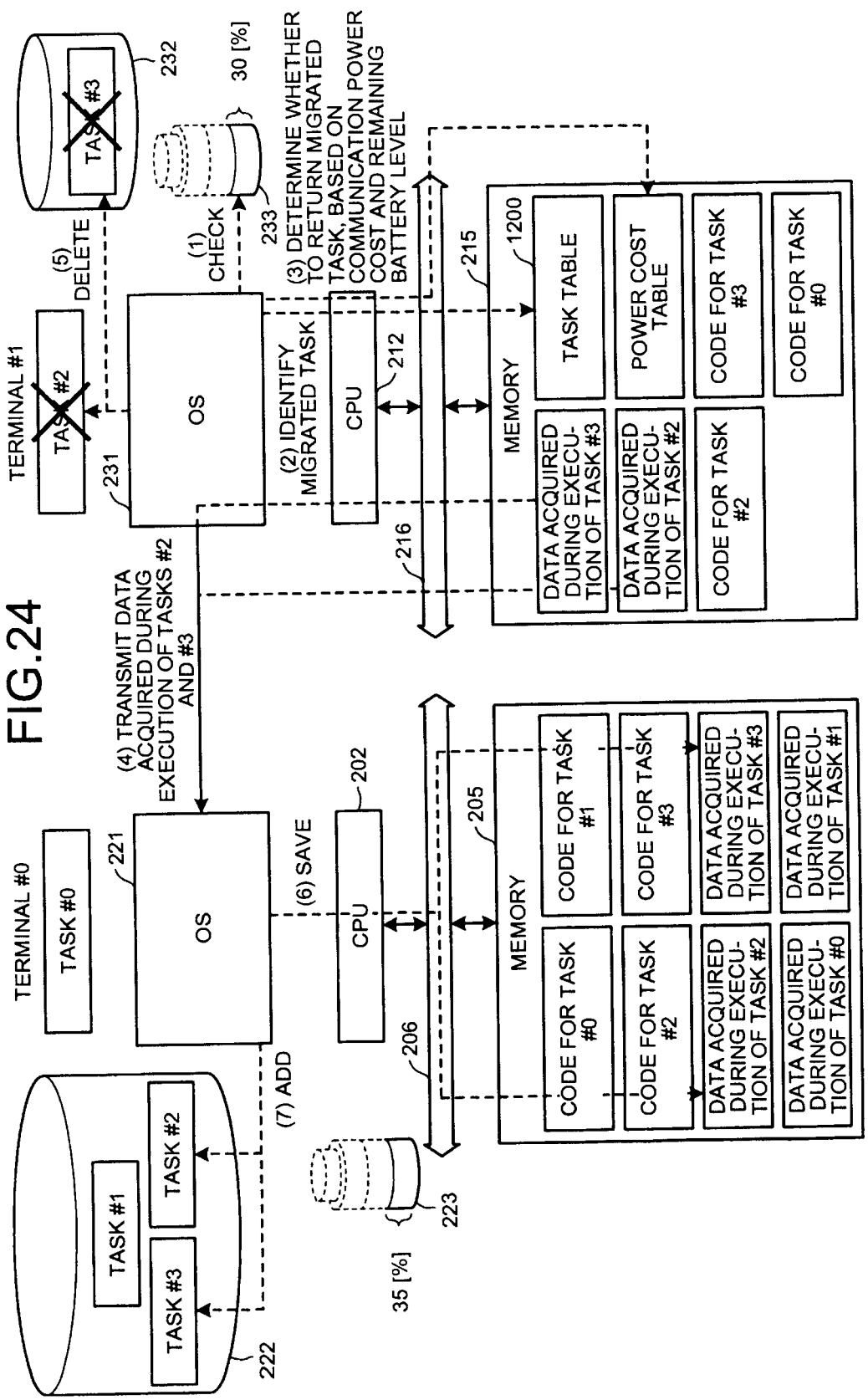
FIG. 24 is an example of checking the remaining battery level at terminal #1 after migration.
Figure 25:
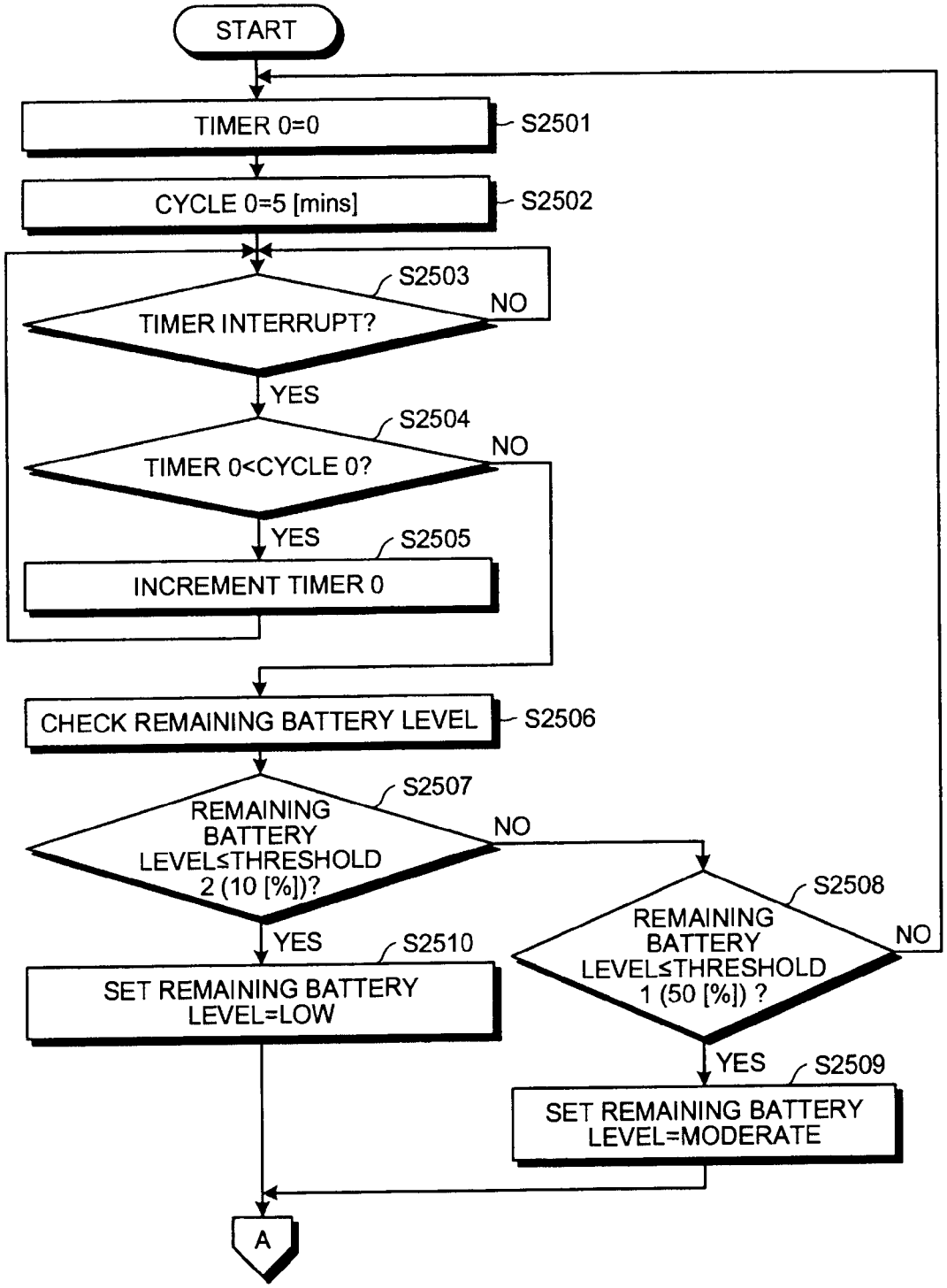
Figure 26:
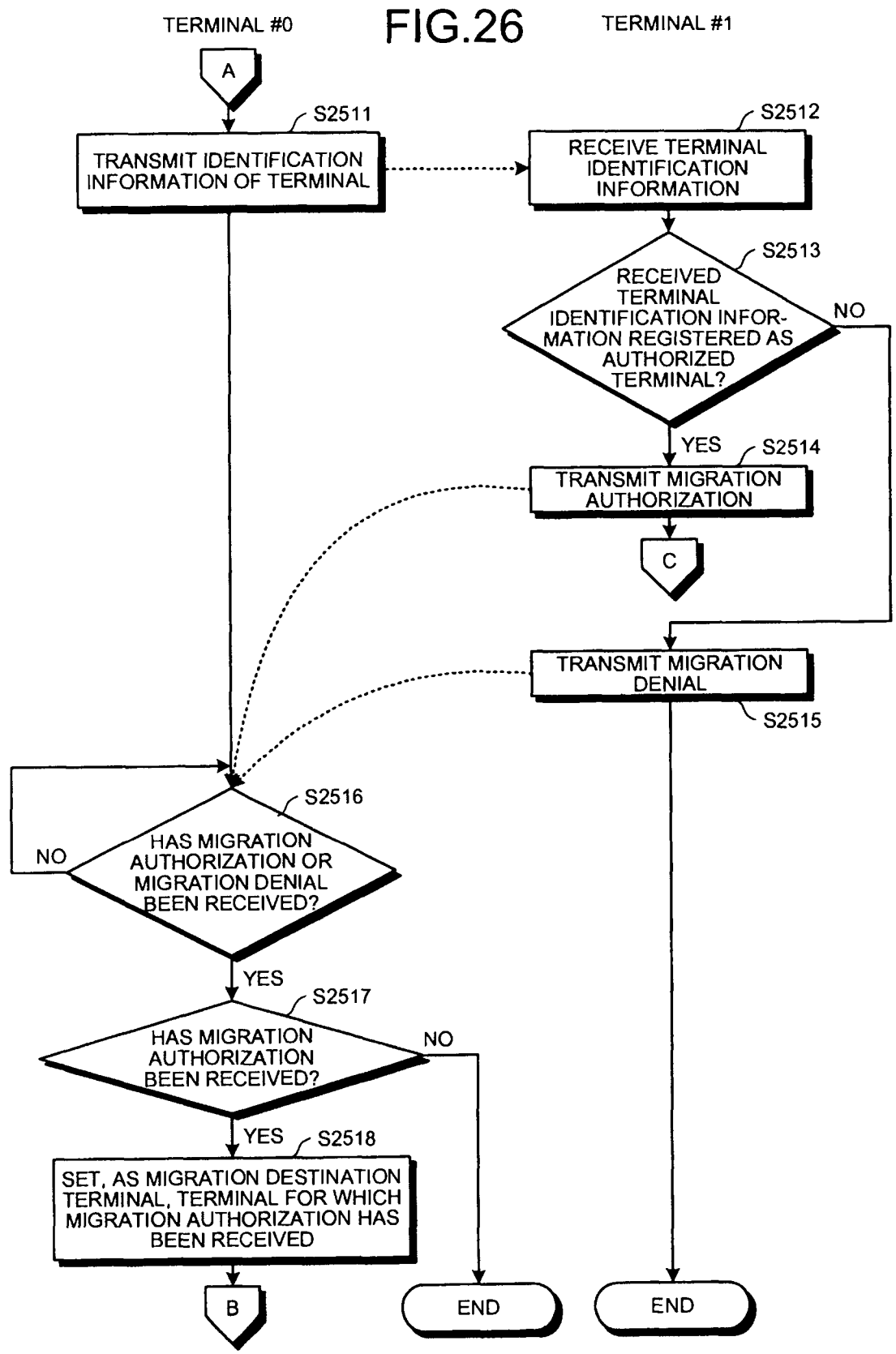
Figure 27:
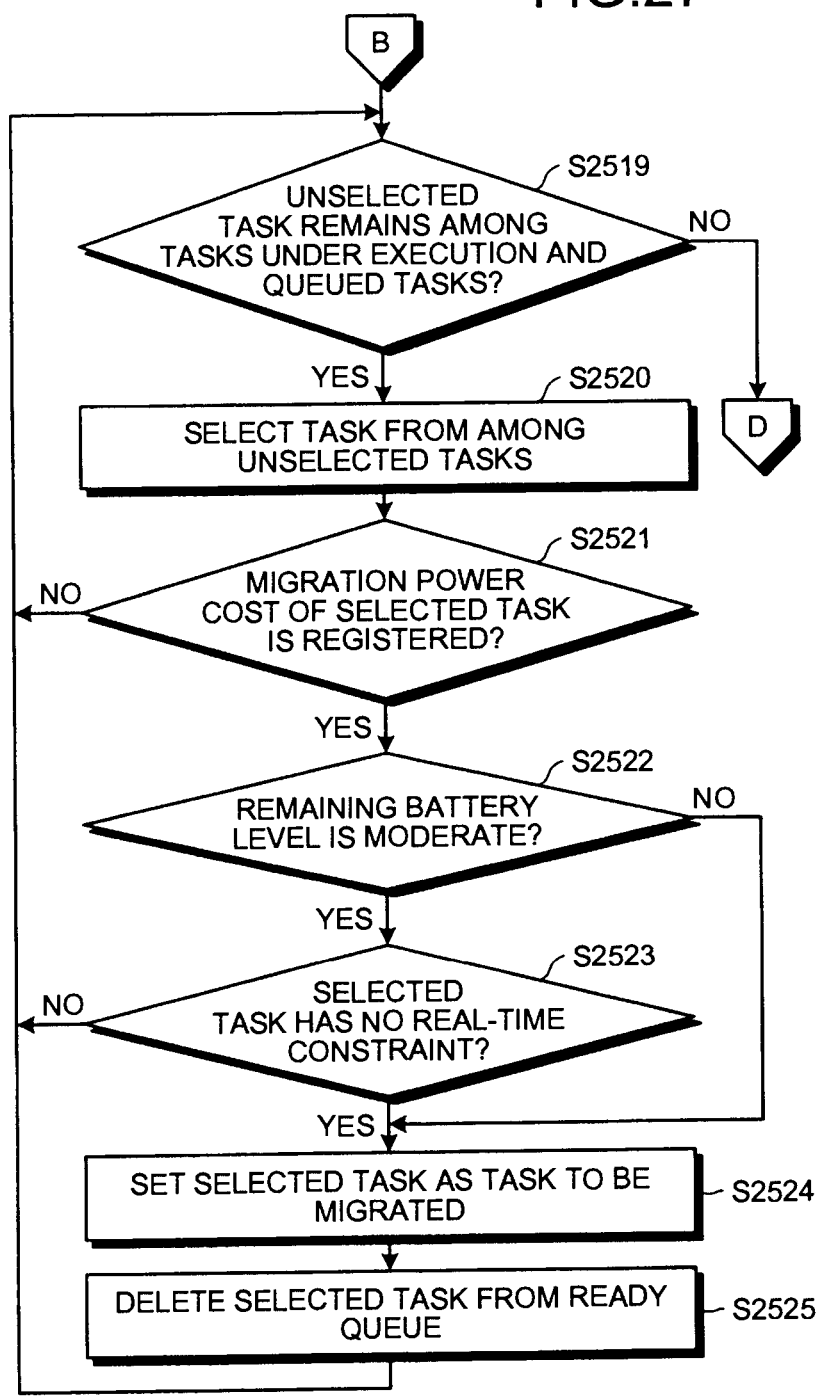
Figure 28:
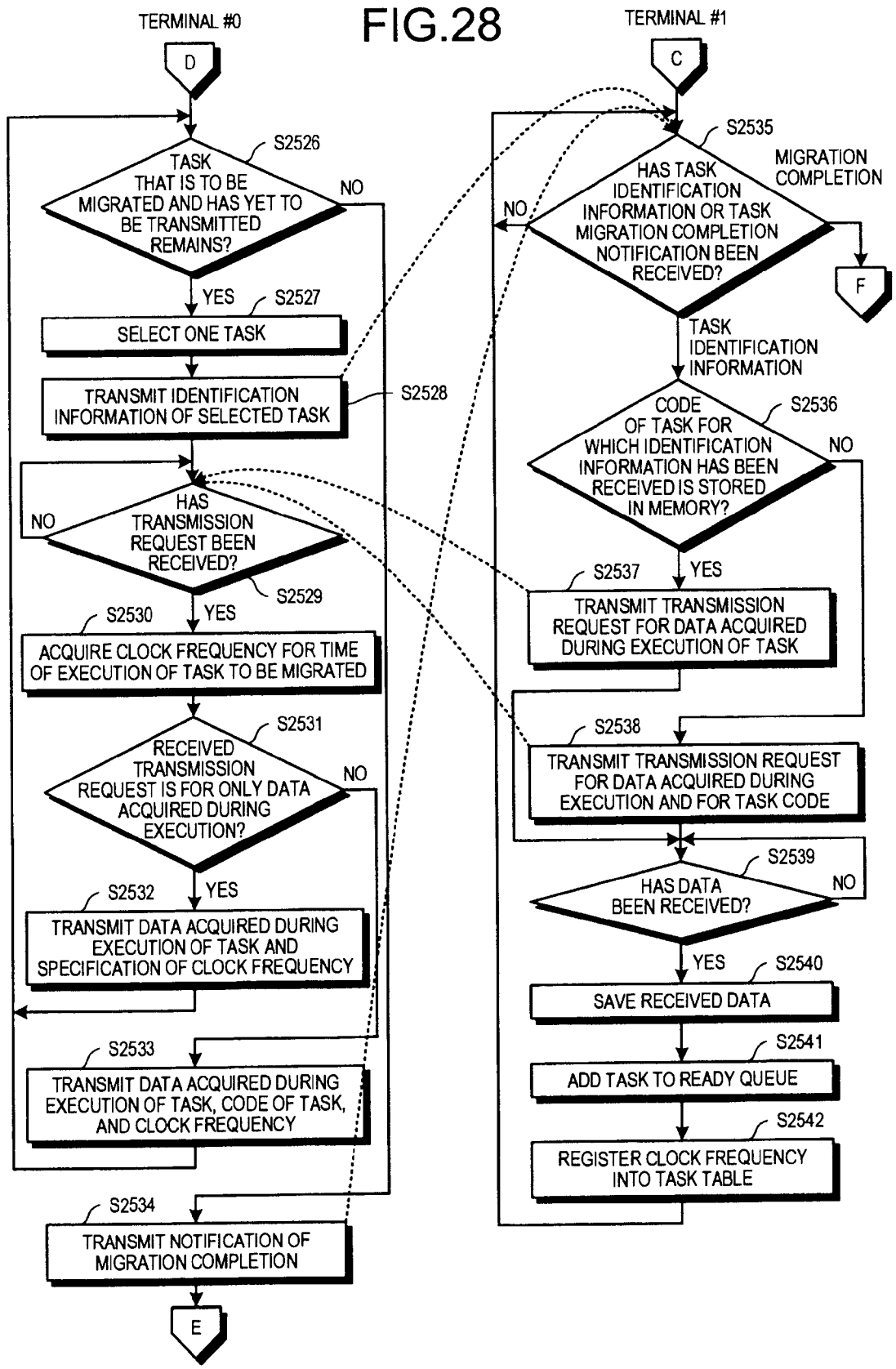
Figure 29:
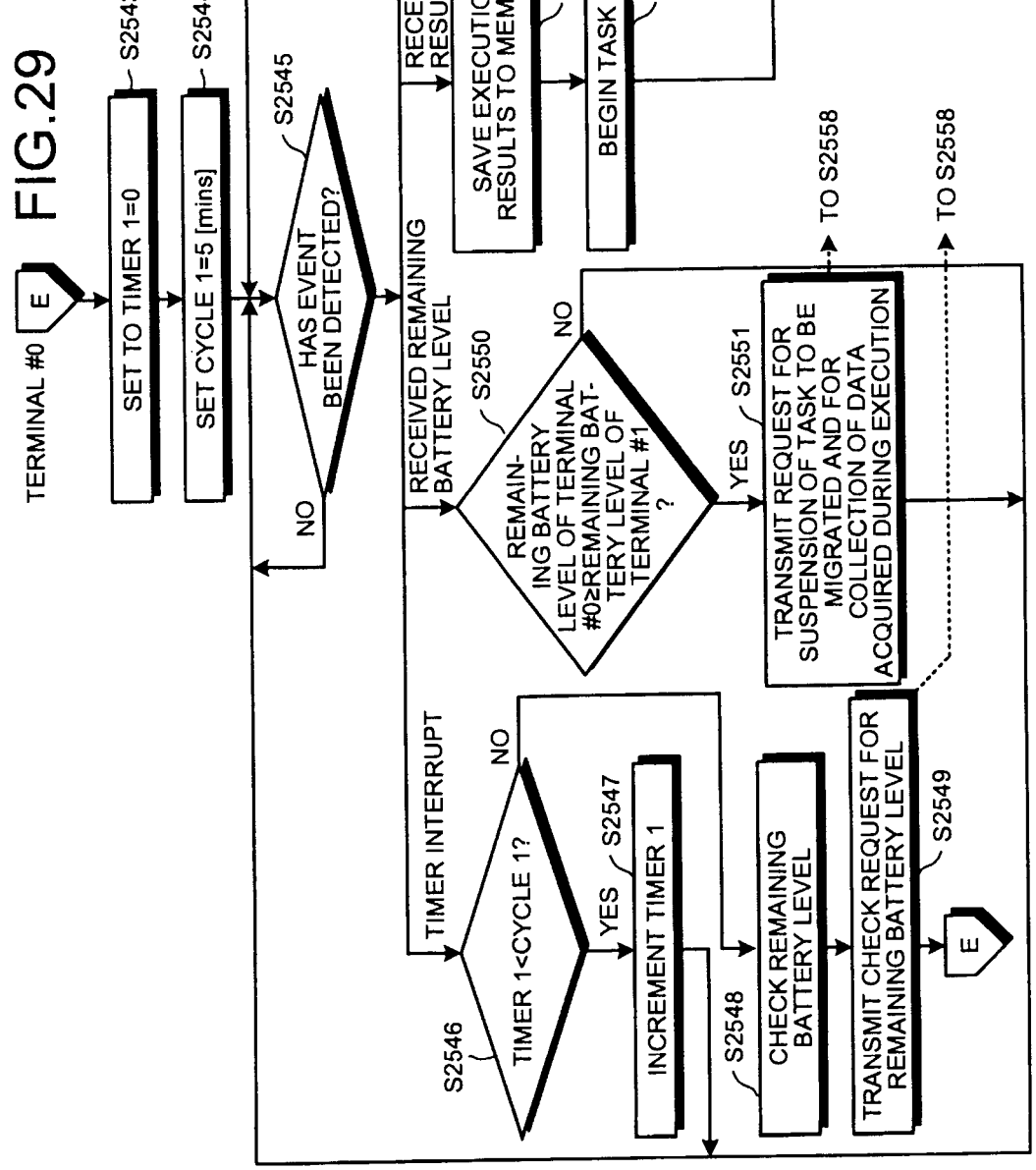
Figure 30:
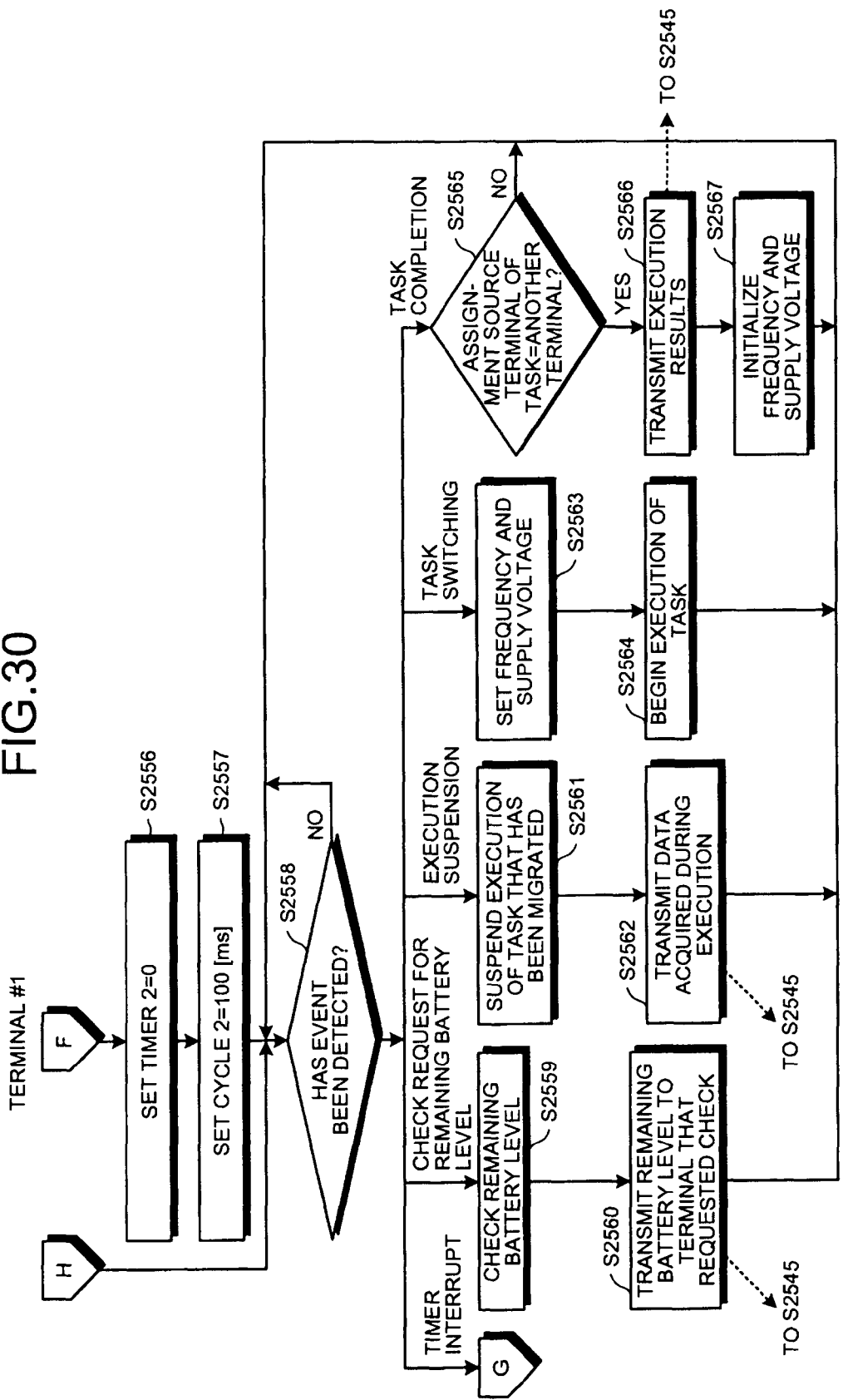

FIG. 24 is an example of checking the remaining battery level at terminal #1 after migration. The OS 231 (1) checks the remaining battery level of terminal #1 at given intervals. The OS 231 (2) identifies from the task table 1200, a task that has been migrated from terminal #0. The OS 231 (3) based on the communication power cost and the remaining battery level, determines whether to return to terminal #0, the task that has been migrated. For example, the OS 231, based on the power cost table, calculates the total transmission power cost for the data acquired during execution of the task migrated from terminal #0.

The OS 231 compares the remaining battery level of terminal #1 and the calculated total×a coefficient, and determines whether the remaining battery level of terminal #1 is less than the total×the coefficient. In this example, the coefficient is a value retained in the power cost table. The OS 231, upon determining that the remaining battery level of terminal #1 is less than the total×the coefficient, (4) transmits to terminal #0, via the communication I/F 213, the data acquired during execution of the task migrated from terminal #0. The OS 231 (5) deletes from the ready queue 232, the task migrated from terminal #0. The OS 221 receives the data acquired during execution of tasks #2 and #3, via the communication I/F 203. The OS 221 (6) saves to the memory 205, the data acquired during execution of tasks #2 and #3, and (7) adds tasks #2 and #3 to the ready queue 222.

In the present embodiment, although terminal #0 executes the processing of the detecting unit 901 to the second transmitting unit 905, terminal #1 may execute the processing of the detecting unit 901 to the second transmitting unit 905. Further, in the present embodiment, for the ease of understanding, only 2 terminals, terminal #0 and terminal #1, are described. Nonetheless, tasks may be migrated between 3 or more terminals, based on the remaining battery levels of each.

FIGS. 25, 26, 27, 28, 29, 30, and 31 are flowcharts of a control procedure of the control apparatus. Terminal #0 sets timer 0=0 (step S2501); cycle 0=5[mins] (step S2502); and determines whether timer interrupt has been detected (step S2503). If no timer interrupt has been detected (step S2503: NO), terminal #0 returns to step S2503.

If timer interrupt has been detected (step S2503: YES), terminal #0 determines whether timer 0<cycle 0 is true (step S2504). If timer 0<cycle 0 is true (step S2504: YES), terminal #0 increments timer 0 (step S2505), and returns to step S2503. In this example, the remaining battery level is assumed to be checked every 5 minutes. The incrementing of timer 0 by terminal #0 is the summing of interrupt time intervals at each timer interrupt and counts the elapse of 5 minutes.

If timer 0<cycle 0 is not true (step S2504: NO), terminal #0 checks the remaining battery level (step S2506), and determines whether the remaining battery level≤threshold 2 (e.g., 10[%] of the battery capacity) (step S2507). If the remaining battery level≤threshold 2 is true (step S2507: YES), terminal #0 sets remaining battery level=low (step S2510), and proceeds to step S2511.

If the remaining battery level≤threshold 2 is not true (step S2507: NO), terminal #0 determines whether the remaining battery level≤threshold 1 is true (e.g., 50[%] of the battery capacity) (step S2508). If the remaining battery level≤threshold 1 is not true (step S2508: NO), terminal #0 returns to step S2501. If the remaining battery level≤threshold 1 is true (step S2508: YES), terminal #0 sets the remaining battery level=moderate (step S2509), and proceeds to step S2511.

At step S2511, terminal #0 transmits terminal identification information (step S2511); terminal #1 receives the terminal identification information (step S2512) and determines whether the received terminal identification information is registered as an authorized terminal (step S2513). In this example, terminal #0 transmits identification information of terminal #0 to terminal #1; and terminal #1 searches for the identification information of terminal #0 in the authorized terminal field in the table.

If the received terminal identification information is registered as an authorized terminal (step S2513: YES), terminal #1 transmits migration authorization (step S2514), and proceeds to step S2535. On the other hand, if the received terminal identification information is not registered as an authorized terminal (step S2513: NO), terminal #1 transmits migration denial (step S2515), and ends the series of processes.

Meanwhile, subsequent to step S2514 or step S2515, terminal #0 determines whether any one among migration authorization and migration denial has been received (step S2516). If neither migration authorization nor migration denial has been received (step S2516: NO), terminal #0 returns to step S2516. If migration authorization or migration denial has been received (step S2516: YES), terminal #0 determines whether migration authorization has been received (step S2517).

If migration authorization has not been received (migration denial has been received) (step S2517: NO), terminal #0 ends the series of processes. On the other hand, if migration authorization has been received (step S2517: YES), terminal #0 sets, as a migration destination terminal, the terminal for which migration authorization has been received (step S2518), and proceeds to step S2519.

Terminal #0 determines whether an unselected task remains among tasks under execution and queued tasks (step S2519). If an unselected task remains (step S2519: YES), terminal #0 selects a task from among the unselected tasks (step S2520).

Terminal #0 determines whether the migration power cost of the selected task is registered (step S2521). If the migration power cost of the selected task is not registered (step S2521: NO), terminal #0 returns to step S2519. If the migration power cost of the selected task is registered (step S2521: YES), terminal #0 determines whether the remaining battery level is moderate (step S2522).

If remaining battery level is moderate (step S2522: YES), the terminal #0 determines whether the selected task has no real-time constraint (step S2523). If the selected task has a real-time constraint (step S2523: NO), terminal #0 returns to step S2519. If the selected task has no real-time constraint (step S2523: YES), terminal #0 sets the selected task as a task to be migrated (step S2524).

Terminal #0 deletes the selected task from the ready queue (step S2525), and returns to step S2519. On the other hand, if the remaining battery level is not moderate (step S2522: NO), terminal #0 proceeds to step S2524. In other words, if the remaining battery level is moderate, among tasks for which the migration power cost is registered, a task having no real-time constraint is migrated to terminal #1. However, if the remaining battery level is low, all tasks for which the migration power cost is registered are migrated to terminal #1.

If no unselected task remains among the tasks under execution and the queued tasks (step S2519: NO), terminal #0 returns to step S2526.

At step S2526, terminal #0 determines whether a task that is to be migrated and has yet to be transmitted remains (step S2526). If a task that is to be migrated and has yet to be transmitted remains (step S2526: YES), terminal #0 selects one of the tasks (step S2527), and transmits the identification information of the selected task (step S2528).

Terminal #1 determines whether task identification information or task migration completion notification has been received (step S2535) and if neither task identification information nor task migration completion notification has been received (step S2535: NO), terminal #1 return to step S2535. If task identification information has been received (step S2535: task identification information), terminal #1 determines whether code of the task for which the identification information has been received is stored in memory (step S2536).

If the code of the task for which the identification information has been received is stored in memory (step S2536: YES), terminal #1 transmits a transmission request for the data acquired during execution of the task (step S2537), and proceeds to step S2539. If the code of the task for which the identification information has been received is not stored in memory (step S2536: NO), terminal #1 transmits a transmission request for the data acquired during execution and for the task code (step S2538), and proceeds to step S2539.

Terminal #0 determines whether a transmission request has been received (step S2529), and if not transmission request has been received (step S2529: NO), returns to step S2529. On the other hand, if a transmission request has been received (step S2529: YES), terminal #0 acquires the clock frequency for the time of execution of the task to be migrated (step S2530). Terminal #0 determines whether the received transmission request is transmission request for only the data acquired during execution (step S2531).

If the received transmission request is for only the data acquired during execution (step S2531: YES), terminal #0 transmits the data acquired during execution of the task to be migrated and specification of the clock frequency for the time of execution of the task to be migrated (step S2532), and returns to step S2526. If the transmission request is not for only the data acquired during execution (step S2531: NO), terminal #0 transmits the data acquired during execution of the task to be migrated, the code of the task to be migrated, and the clock frequency for the task to be migrated (step S2533). Subsequent to step S2533, terminal #0 returns to step S2526.

If no task that is to be migrated and has yet to be transmitted remains (step S2526: NO), terminal #0 transmits notification of migration completion (step S2534), and proceeds to step S2543.

Meanwhile, at step S2539, terminal #1 determines whether data has been received (step S2539), and if data has not been received (step S2539: NO), returns to step S2539. If data has been received (step S2539: YES), terminal #1 saves the received data (step S2540), and adds the concerned task to the ready queue (step S2541). Terminal #1 registers the clock frequency into the task table (step S2542), and returns to step S2535.

Terminal #0 sets timer 1=0 (step S2543), sets cycle 1=5 [mins] (step S2544), and determines whether the occurrence of an event has been detected (step S2545). If the occurrence of an event has not been detected (step S2545: NO), terminal #0 returns to step S2545. If timer interrupt has been detected (step S2545: timer interrupt), terminal #0 determines whether timer 1<cycle 1 is true (step S2546).

If timer 1<cycle 1 is true (step S2546: YES), terminal #0 increments timer 1 (step S2547), and returns to step S2545. If timer 1<cycle 1 is not true (step S2546: NO), terminal #0 checks the remaining battery level (step S2548), transmits a check request for the remaining battery level (step S2549), and returns to step S2543.

At step S2545, if terminal #0 determines that specification of the remaining battery level has been received from terminal #1 (step S2545: received remaining battery level), terminal #0 determines whether the remaining battery level of terminal #0≥the remaining battery level of terminal #1 is true (step S2550). If the remaining battery level of terminal #0≥the remaining battery level of terminal #1 is true (step S2550: YES), terminal #0 transmits a request for suspension of the execution of the task to be migrated and for collection of the data acquired during execution (step S2551), and returns to step S2545. If the remaining battery level of terminal #0≥the remaining battery level of terminal #1 is not true (step S2550: NO), terminal #0 returns to step S2545.

At step S2545, if execution results have been received from terminal #1 (step S2545: received execution results), terminal #0 saves the received execution results to memory (step S2552). Terminal #0 begins the task for which the execution results have been received (step S2553), and returns to step S2545.

At step S2545, if data acquired during execution has been received from terminal #1 (step S2545: received data acquired during execution), terminal #0 saves the data acquired during execution to memory (step S2554), adds to the ready queue, the task for which the data acquired during execution has been collected (step S2555), and returns to step S2545.

Subsequent to migration completion at step S2535, terminal #1 sets timer 2=0 (step S2556), sets cycle 2=100 [ms] (step S2557), and determines whether the occurrence of an event has been detected (step S2558). If the occurrence of an event has not been detected (step S2558: NO), terminal #1 returns to step S2558. If terminal #1 determines that a check request for the remaining battery level has been received (step S2558: check request for remaining battery level), terminal #1 checks the remaining battery level (step S2559), and transmits the remaining battery level to the terminal that requested the check (step S2560).

At step S2558, if terminal #1 determines that an execution suspension request has been received (step S2558: execution suspension), terminal #1 suspends the execution of the task that has been migrated (step S2561), and transmits to the migration source terminal, the data acquired during execution (step S2562).

At step S2558, if terminal #1 determines that task switching has been detected (step S2558: task switching), the terminal "1 sets the frequency and supply voltage according to the task that has been switched to (step S2563). Terminal #1 begins execution of the task (step S2564).

At step S2558, if terminal #1 determines that task execution has been completed (step S2558: task execution completion), terminal #1 determines whether the assignment source terminal of the task that has been completed is another terminal (step S2565). If the assignment source terminal is not another terminal (step S2565: NO), terminal #1 returns to step S2558. If the assignment source terminal is another terminal (step S2565: YES), terminal #1 transmits execution results to the assignment source terminal (step S2566), initializes the frequency and the supply voltage (step S2567), and returns to step S2558.

At step S2558, if terminal #1 determines that timer interrupt has been detected (step S2558: timer interrupt), terminal #1 determines whether timer 2<cycle 2 is true (step S2568). If timer 2<cycle 2 is true (step S2568: YES), terminal #1 increments timer 2 (step S2569), and returns to step S2558.

On the other hand, if timer 2<cycle 2 is not true (step S2568: NO), terminal #1 checks the remaining battery level (step S2570), and acquires the communication power cost for the data acquired during execution of the migrated task (step S2571). Terminal #1 determines whether the remaining battery level<the total communication power cost of the data acquired during execution of the migrated task×a coefficient is true (step S2572).

If the remaining battery level<the total communication power cost for the data acquired during execution of the migrated task×the coefficient is not true (step S2572: NO), terminal #1 returns to step S2556. On the other hand, if the remaining battery level<the total communication power cost of the data acquired during execution of the migrated task×the coefficient is true (step S2572: YES), terminal #1 transmits to the migration source terminal, the data acquired during execution of the migrated task (step S2573), deletes the migrated task from the ready queue (step S2574), and returns to step S2556.

As described, according to the control program, the control apparatus, and the control method, when the remaining battery level of a first terminal becomes less than or equal to a threshold while a task is under execution, the execution of the task is suspended, identification information of the task is transmitted to a second terminal, and the task is executed by the second terminal. In other words, migration of the task under execution to the second terminal enables consumption of the battery of the first terminal consequent to the execution of the task to be suppressed prevents loss of execution results for the task.

Even when the second terminal does not have the code of the task, transmission of the code of the task to the second terminal enables the task to be migrated to the second terminal, thereby enabling battery consumption at the first terminal to be suppressed.

When there is indication that the code of the task has information related to execution potential, transmission of an execution instruction for the task to the second terminal enables the task to be migrated to the second terminal, thereby enabling battery consumption at the first terminal to be suppressed.

Transmission of execution results of the task to the second terminal enables the task to be migrated to the second terminal, thereby enabling battery consumption at the first terminal to be suppressed, even when the execution results have continuity.

When the task cannot be executed by the second terminal, continuing execution of the task enables control of the execution of the task by the first terminal.

Even when the remaining battery level of the first terminal becomes less than or equal to a threshold, if there is an execution time limit from the start of execution of a task under execution, the task is not migrated to the second terminal. As a result, since the execution of the task is not interrupted, the execution time limit of the task can be met.

When the remaining battery level of the first terminal becomes less than or equal to another threshold that is less that the threshold and if there is an execution time limit from the start of execution of the task under execution, the task is migrated to the second terminal. As a result, exhaustion of the battery of the first terminal can be prevented, whereby the loss of execution results consequent to exhaustion of the first terminal can be prevented.

As described, according to the control program, the control apparatus, and the control method, while a task for which an execution instruction is received from the first terminal is under execution by the second terminal, detection of the remaining battery level of the second terminal becoming less than or equal to the threshold is performed. If the remaining battery level of the second terminal is detected to have become less than or equal to the threshold, execution results of the task are transmitted to the first terminal, whereby the loss of execution results for the task can be prevented.

Further, according to the control program, the control apparatus, and the control method, if the task for which an execution instruction has been received from the first terminal has an execution time limit from the start of execution of the task, the value of the supply voltage provided to the CPU is decreased. As a result, power saving at the second terminal as well as suppressed battery consumption at the second terminal can be achieved.

According to the control program, the control apparatus, and the control method, if the task for which an execution instruction has been received from the first terminal has an execution time limit from the start of execution of the task, the clock frequency provided to the CPU is reduced. As a result, power saving at the second terminal as well as suppressed battery consumption at the second terminal can be achieved.

The control program, the control apparatus, and the control method suppress battery consumption for the execution of tasks.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable medium storing a control program configured to cause a processor of a first terminal to execute a process, the process comprising:
   detecting that a remaining battery level of the first terminal is not more than a first threshold while a task is executed by the first terminal;
   suspending execution of the task when the remaining battery level of the first terminal is detected not to be more than the first threshold;
   transmitting to a second terminal that is capable of communicating with the first terminal, when the remaining battery level of the first terminal is detected not to be more than the first threshold, identification information of the task;

receiving from the second terminal, after the identification information of the task is transmitted, information related to a potential of executing the task; and transmitting to the second terminal, information corresponding to the information related to the potential of executing the task, wherein:

transmitting to the second terminal the identification information of the task includes not transmitting to the second terminal the identification information of the task, even when the remaining battery level of the first terminal is detected not to be more than the first threshold, if the task has an execution time limit from a start of execution of the task, and suspending execution of the task includes not suspending the execution of the task, even when the remaining battery level of the first terminal is detected not to be more than the first threshold, if the task has an execution time limit from the start of execution of the task.

2. The non-transitory computer-readable medium according to claim 1, wherein transmitting the information to the second terminal includes transmitting to the second terminal, code of the task and an execution instruction for the task, when the infonnation related to the potential of executing the task indicates that the second terminal does not have the code of the task.

3. The non-transitory computer-readable medium according to claim 2, wherein transmitting the information to the second terminal includes transmitting to the second terminal, execution results of the task.

4. The non-transitory computer-readable medium according to claim 1, wherein transmitting the information to the second terminal includes transmitting to the second terminal, an execution instruction for the task, when the information related to the potential of executing the task indicates that the second terminal has code of the task.

5. The non-transitory computer-readable medium according to claim 1, wherein suspending execution of the task includes not suspending execution of the task, when the information related to the potential of executing the task indicates that the execution of the task by the second terminal is impossible.

6. The non-transitory computer-readable medium according to claim 1, wherein:

detecting includes detecting that the remaining battery level is not more than a second threshold that is less than the first threshold, and transmitting the identification information of the task to the second terminal includes transmitting to the second terminal, the identification information of the task, even when the task has an execution time limit from the start of execution of the task, if the remaining battery level is detected not to be more than the second threshold.

7. A non-transitory computer-readable medium storing a control program causing a processor of a second terminal to execute a process, the process comprising:

receiving from a first terminal, an execution instruction for a task migrated to the second terminal;

setting a clock supply source to provide to the processor of the second terminal, when the task is determined to not have an execution time limit from a start of execution of the task, a clock of a frequency lower than that for a task having the execution time limit; and executing the task after the setting of the clock supply source.

8. A non-transitory computer-readable medium storing a control program configured to cause a processor of a second terminal to execute a process, the process comprising:

receiving from a first terminal, an execution instruction for a task migrated to the second terminal;

setting a voltage supply source to provide to the processor of the second terminal, when the task is determined to not have an execution time limit from a start of execution of the task, a voltage of a value lower than that for a task having the execution time limit; and executing the task after the setting of the voltage supply source.

9. A control apparatus comprising a processor configured to:

detect that a remaining battery level of a first terminal is not more than a threshold while a task is executed by the first terminal;

suspend execution of the task upon detecting that the remaining battery level of the first terminal is not more than the threshold;

transmit to a second terminal that is capable of communicating with the first terminal, upon detecting that the remaining battery level of the first terminal is not more than the threshold, identification information of the task;

receive from the second terminal, after transmitting the identification information of the task to the second terminal, information related to a potential of executing the task; and transmit to the second terminal, information corresponding to the information related to the potential of executing the task, wherein:

transmitting to the second terminal the identification information of the task includes not transmitting to the second terminal the identification information of the task, even when the remaining battery level of the first terminal is detected not to be more than the first threshold, if the task has an execution time limit from a start of execution of the task, and suspending execution of the task includes not suspending the execution of the task, even when the remaining battery level of the first terminal is detected not to be more than the first threshold, if the task has an execution time limit from the start of execution of the task.

10. A control apparatus comprising a processor configured to:

receive from a first terminal, an execution instruction for a task migrated to a second terminal;

set a clock supply source to provide to a processor of the second terminal, when the task is determined to not have an execution time limit from a start of execution of the task, a clock of a frequency lower than that for a task having the execution time limit; and execute the task after setting the clock supply source.

11. A control apparatus comprising a processor configured to:

receive from a first terminal, an execution instruction for a task migrated to a second terminal;

set a voltage supply source to provide to a processor of the second terminal, when the task is determined to not have an execution time limit from a start of execution of the task, a voltage of a value lower than that for a task having the execution time limit; and execute the task after setting the voltage supply source.

12. A control method to be executed by a processor, the control method comprising:
- detecting that a remaining battery level of a first terminal is not more than a threshold while a task is executed by the first terminal;
- suspending execution of the task upon detecting that the remaining battery level of the first terminal is not more than the threshold;
- transmitting to a second terminal that is capable of communicating with the first terminal, upon detecting that the remaining battery level of the first terminal is not more than the threshold, identification information of the task;
- receiving from the second terminal, after transmitting the identification information of the task, information related to a potential of executing the task; and
- transmitting to the second terminal, information corresponding to the information related to the potential of executing the task.

13. A control method to be executed by a processor, the control method comprising:
- receiving from a first terminal, an execution instruction for a task migrated to a second terminal;
- setting a clock supply source to provide to a processor of the second terminal, when the task is determined to not have an execution time limit from a start of execution of the task, a clock of a frequency lower than that for a task having the execution time limit; and
- executing the task after setting the clock supply source.

14. A control method to be executed by a processor, the control method comprising:
- receiving from a first terminal, an execution instruction for a task migrated to a second terminal;
- setting a voltage supply source to provide to a processor of the second terminal, when the task is determined to not have an execution time limit from a start of execution of the task, a voltage of a value lower than that for a task having the execution time limit; and
- executing the task after setting the voltage supply source.

* * * * *